US011477618B2

(12) United States Patent
Jung et al.

(10) Patent No.: US 11,477,618 B2
(45) Date of Patent: Oct. 18, 2022

(54) BASE STATION GROUP RECONFIGURATION MESSAGING BASED ON TERMINAL MOVEMENT

(71) Applicants: Samsung Electronics Co., Ltd., Suwon-si (KR); Seoul National University R&DB Foundation, Seoul (KR)

(72) Inventors: Byounghoon Jung, Suwon-si (KR); Kitaek Lee, Seoul (KR); Sunghyun Choi, Seoul (KR); Seungil Park, Suwon-si (KR); Heejin Yang, Seoul (KR); Kyungjin Lee, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 78 days.

(21) Appl. No.: 16/940,579

(22) Filed: Jul. 28, 2020

(65) Prior Publication Data
US 2021/0051448 A1 Feb. 18, 2021

(30) Foreign Application Priority Data
Aug. 14, 2019 (KR) .......................... 10-2019-0099841

(51) Int. Cl.
*H04W 4/08* (2009.01)
*H04W 76/10* (2018.01)
(Continued)

(52) U.S. Cl.
CPC ............. *H04W 4/08* (2013.01); *H04L 5/0048* (2013.01); *H04W 8/22* (2013.01);
(Continued)

(58) Field of Classification Search
CPC ..... H04W 16/04; H04W 16/10; H04W 24/02; H04W 24/10; H04W 28/0268;
(Continued)

(56) References Cited

U.S. PATENT DOCUMENTS 8,838,119 B2 9/2014 Ma et al.
2019/0356460 A1* 11/2019 Tsuboi .................. H04W 28/18

OTHER PUBLICATIONS

Li et al., Coalition Formation Game Based Energy Efficiency Oriented Cooperative Caching Scheme in UUDN, ICST Institute for Computer Sciences, Social Informatics and Telecommunications Engineering 2019, pp. 458-468, 2019.
(Continued)

*Primary Examiner* — Philip Sobutka
(74) *Attorney, Agent, or Firm* — Jefferson IP Law, LLP

(57) ABSTRACT

A communication method and apparatus for communicating with an intelligent base station in a wireless communication system are provided. An operation method of the intelligent base station includes determining whether reconfiguration of an intelligent base station group that supports a terminal is necessary, according to movement information of the terminal, the determination being performed by a first intelligent base station included in the intelligent base station group, when the first intelligent base station determines that reconfiguration of the intelligent base station group is necessary, transmitting a join request to join the intelligent base station group, to a nearby intelligent base station not included in the intelligent base station group, receiving a join approval message in response to the transmitted join request, and reconfiguring the intelligent base station group, based on the received join approval message.

19 Claims, 16 Drawing Sheets

(51) Int. Cl.
  *H04W 28/02*   (2009.01)
  *H04W 8/22*    (2009.01)
  *H04L 5/00*    (2006.01)
  *H04W 48/08*   (2009.01)
(52) U.S. Cl.
  CPC ....... *H04W 28/0268* (2013.01); *H04W 48/08* (2013.01); *H04W 76/10* (2018.02)
(58) Field of Classification Search
  CPC ......... H04W 48/08; H04W 4/08; H04W 4/50; H04W 76/10; H04W 84/005; H04W 88/06; H04W 88/10; H04W 8/08; H04W 8/22; H04L 5/0048; H04L 5/0051
  See application file for complete search history.

(56) References Cited

OTHER PUBLICATIONS

Cho et al., When UUDN meets 5G waveforms: New Challenge of Signal Linearity, 2017 IEEE International Conference on Applied System Innovation.

\* cited by examiner

........... LINK BETWEEN NEARBY INTELLIGENT BASE STATIONS
———— CONTROL SIGNALING LINK

······· LINK BETWEEN NEARBY INTELLIGENT BASE STATIONS
——— CONTROL SIGNALING LINK

BASE STATION GROUP RECONFIGURATION MESSAGING BASED ON TERMINAL MOVEMENT

CROSS-REFERENCE TO RELATED APPLICATION(S)

This application is based on and claims priority under 35 U.S.C. § 119(a) of a Korean patent application number 10-2019-0099841, filed on Aug. 14, 2019, in the Korean Intellectual Property Office, the disclosure of which is incorporated by reference herein in its entirety.

BACKGROUND

1. Field

The disclosure relates to wireless communication systems. More particularly, the disclosure relates to a method and apparatus for communicating with an intelligent base station. More particularly, the disclosure relates to a method, performed by a plurality of intelligent base stations supporting a terminal, of efficiently supporting the terminal by forming an intelligent base station group.

2. Description of the Related Art

Fifth generation (5G) communication systems standardized in the 3rd Generation Partnership Project (3GPP) are called new radio (NR) systems. In order to achieve a high data transmission rate, consideration is given to implementing 5G communication systems in millimeter wave (mmW) frequency bands (e.g., 60 GHz bands). In order to reduce path loss and increase a transmission distance in the millimeter wave frequency bands, in 5G communication systems, discussions are underway about technologies such as beamforming, massive multiple input multiple output (MIMO), full dimensional MIMO (FD-MIMO), array antenna, analog beam-forming, and large scale antenna. In next-generation mobile communication after 5G, the number of base stations may increase and the size of a cell may decrease, in order for a fixed station to support terminals the number of which geometrically increases due to use of millimeter wave (mmW) frequency bands. In ultra-dense networks based on fixed base stations, overload of data traffic may occur in a specific base station, or a base station not required by the data traffic that varies according to time or space may exist, and thus energy efficiency may decrease or costs may increase.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an operation method and a first intelligent base station capable of effectively providing a service in a wireless communication system.

Another aspect of the disclosure is to provide an operation method and a nearby intelligent base station capable of joining in an intelligent base station group in order to effectively provide a service in a wireless communication system.

Another aspect of the disclosure is to provide an operation method and a mobile base station for efficiently operating a network in a wireless communication system.

Additional aspects will be set forth in part in the description which follows and, in part, will be apparent from the description, or may be learned by practice of the presented embodiments.

In accordance with an aspect of the disclosure, an operation method of a first intelligent base station is provided. The operation method includes determining whether reconfiguration of an intelligent base station group that supports a terminal is necessary, according to movement information of the terminal, wherein the determination is performed by a first intelligent base station included in the intelligent base station group, when the first intelligent base station determines that reconfiguration of the intelligent base station group is necessary, transmitting a join request to join the intelligent base station group to a nearby intelligent base station not included in the intelligent base station group, receiving a join approval message in response to the transmitted join request, and reconfiguring the intelligent base station group, based on the received join approval message.

According to an embodiment of the disclosure, the determining whether reconfiguration of the intelligent base station group is necessary includes receiving network information necessary to determine whether reconfiguration of the intelligent base station group is necessary, from a second intelligent base station within the intelligent base station group, and determining whether reconfiguration of the intelligent base station group is necessary, based on the received network information. The network information may include at least one of power of an uplink reference signal received by the second intelligent base station from the terminal, a signal to noise ratio (SNR), an amount of traffic of the terminal, or a quality of service (QoS) of the terminal.

According to an embodiment of the disclosure, the reconfiguring of the intelligent base station group includes determining, based on the received join approval message, whether to include the nearby intelligent base station in the intelligent base station group, transmitting join information of the nearby intelligent base station to the nearby intelligent base station and a gateway node, and receiving updated intelligent base station group information from the gateway node.

According to an embodiment of the disclosure, the operation method includes forming a control signaling link with another intelligent base station included in the intelligent base station group, and exchanging network information between the other intelligent base station and the terminal through the formed control signaling link. The network information may include at least one of the number of terminals connected to each of the intelligent base stations in the intelligent base station group, the amount of traffic of a terminal supported by each of the intelligent base stations in the intelligent base station group, the power of a received uplink reference signal, the QoS of the terminal supported by each of the intelligent base stations within the intelligent base station group, an SNR, or mobility information of the terminal predicted by each of the intelligent base stations in the intelligent base station group.

According to an embodiment of the disclosure, the operation method of the first intelligent base station includes transmitting, to the terminal, a trigger message informing that reconfiguration of the intelligent base station group starts, when it is determined that reconfiguration of the intelligent base station group is necessary.

According to an embodiment of the disclosure, the join approval message includes at least one of the amount of traffic of the nearby intelligent base station, the power of an uplink reference signal transmitted by the terminal, or an SNR.

According to an embodiment of the disclosure, the operation method includes selecting the first intelligent base station, based on at least one of scheduling information, a channel state information, or predicted mobility information of the terminal, and transmitting information about the selected first intelligent base station to another intelligent base station of the intelligent base station group.

According to an embodiment of the disclosure, the operation method includes determining whether to operate mobile communication equipment not included in the intelligent base station group as a mobile base station, and allocating an identifier (ID) necessary for the mobile communication equipment to operate as a mobile base station to the mobile communication equipment. The nearby intelligent base station may be the mobile base station.

According to an embodiment of the disclosure, the determining whether to operate mobile communication equipment as a mobile base station includes transmitting, to the mobile communication equipment, an operation request to operate as the mobile base station, receiving an operation approval message from the mobile communication equipment, and determining whether to operate the mobile communication equipment as the mobile base station.

According to an embodiment of the disclosure, the determining whether to operate mobile communication equipment as a mobile base station includes receiving a network join request message from the mobile communication equipment, and transmitting a network join approval message to the mobile communication equipment, based on the received network join request message.

According to an embodiment of the disclosure, the allocating of the identifier necessary for the mobile communication equipment to operate as the mobile base station to the mobile communication equipment includes allocating the identifier received in response to a request according to the result of the determining whether to operate the mobile communication equipment as the mobile base station or previously received in response to a request to the mobile communication equipment, when it is determined to operate the mobile communication equipment as the mobile base station.

According to an embodiment of the disclosure, the allocating of the identifier necessary for the mobile communication equipment to operate as a mobile base station to the mobile communication equipment includes requesting a gateway node for an identifier that is to be allocated to the mobile communication equipment, receiving the identifier from the gateway node, and allocating the received identifier to the mobile communication equipment.

According to an embodiment of the disclosure, the operation method of the first intelligent base station includes previously receiving, from the gateway node, a group of identifiers that may be used by the mobile communication equipment. The allocating of the identifier necessary for the mobile communication equipment to operate as a mobile base station to the mobile communication equipment may include allocating one identifier within the group of the identifiers to the mobile communication equipment, and transmitting information about the allocated identifier to the gateway node.

In accordance with another aspect of the disclosure, an operation method of a nearby intelligent base station in a wireless communication system is provided. The operation method includes receiving a join request to join an intelligent base station group that supports a terminal, from an intelligent base station within the intelligent base station group, receiving an uplink reference signal from the terminal, based on the join request, determining whether to join the intelligent base station group, based on the received uplink reference signal, when the nearby intelligent base station determines to join the intelligent base station group, transmitting a join approval message to the intelligent base station, and supporting the terminal by serving as an intelligent base station within the intelligent base station group, based on the transmitted join approval message.

According to another embodiment of the disclosure, the operation method includes receiving join information of the nearby intelligent base station from the intelligent base station, based on the join approval message, and receiving updated intelligent base station group information from a gateway node.

According to another embodiment of the disclosure, the determining whether to join the intelligent base station group includes determining whether to join the intelligent base station group, based on at least one of a QoS of the terminal or the amount of traffic of the nearby intelligent base station.

According to another embodiment of the disclosure, the operation method includes receiving an operation request to operate as a mobile base station, from the intelligent base station, determining whether to operate as the mobile base station, based on the operation request, when the nearby intelligent base station determines to operate as the mobile base station, transmitting an operation approval message to the intelligent base station, and receiving an identifier for operating as the mobile base station and information about a neighboring intelligent base station, from the intelligent base station within the intelligent base station group. The nearby intelligent base station may be a mobile base station not included in the intelligent base station group.

According to another embodiment of the disclosure, the operation method includes determining whether to operate as a mobile base station, based on at least one of an QoS of mobile communication equipment or traffic of a network, when the nearby intelligent base station determines to operate as the mobile base station, transmitting a network join request message to the intelligent base station, and receiving an identifier for operating as the mobile base station and information about a neighboring intelligent base station, from the intelligent base station within the intelligent base station group. The nearby intelligent base station may be a mobile base station not included in the intelligent base station group.

In accordance with another aspect of the disclosure, a first intelligent base station within an intelligent base station group that supports a terminal in a wireless communication system is provided. The first intelligent base station includes a communication interface, a memory storing one or more instructions, and one or more processors configured to execute the one or more instructions stored in the memory to determine whether reconfiguration of the intelligent base station group is necessary, according to movement information of the terminal, when the first intelligent base station determines that reconfiguration of the intelligent base station group is necessary, transmit a join request to join the intelligent base station group to a nearby intelligent base station not included in the intelligent base station group, receive a join approval message in response to the transmitted join request, and reconfigure the intelligent base station group, based on the received join approval message.

In accordance with another aspect of the disclosure, a nearby intelligent base station in a wireless communication system is provided. The nearby intelligent base station includes a communication interface, a memory storing one or more instructions, and one or more processors configured to execute the one or more instructions stored in the memory to receive a join request to join an intelligent base station group that supports a terminal, from an intelligent base station within the intelligent base station group, receive an uplink reference signal from the terminal, based on the join request, determine whether to join the intelligent base station group, based on the received uplink reference signal, when the nearby intelligent base station determines to join the intelligent base station group, transmit a join approval message to the intelligent base station, and support the terminal by serving as an intelligent base station within the intelligent base station group, based on the transmitted join approval message.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
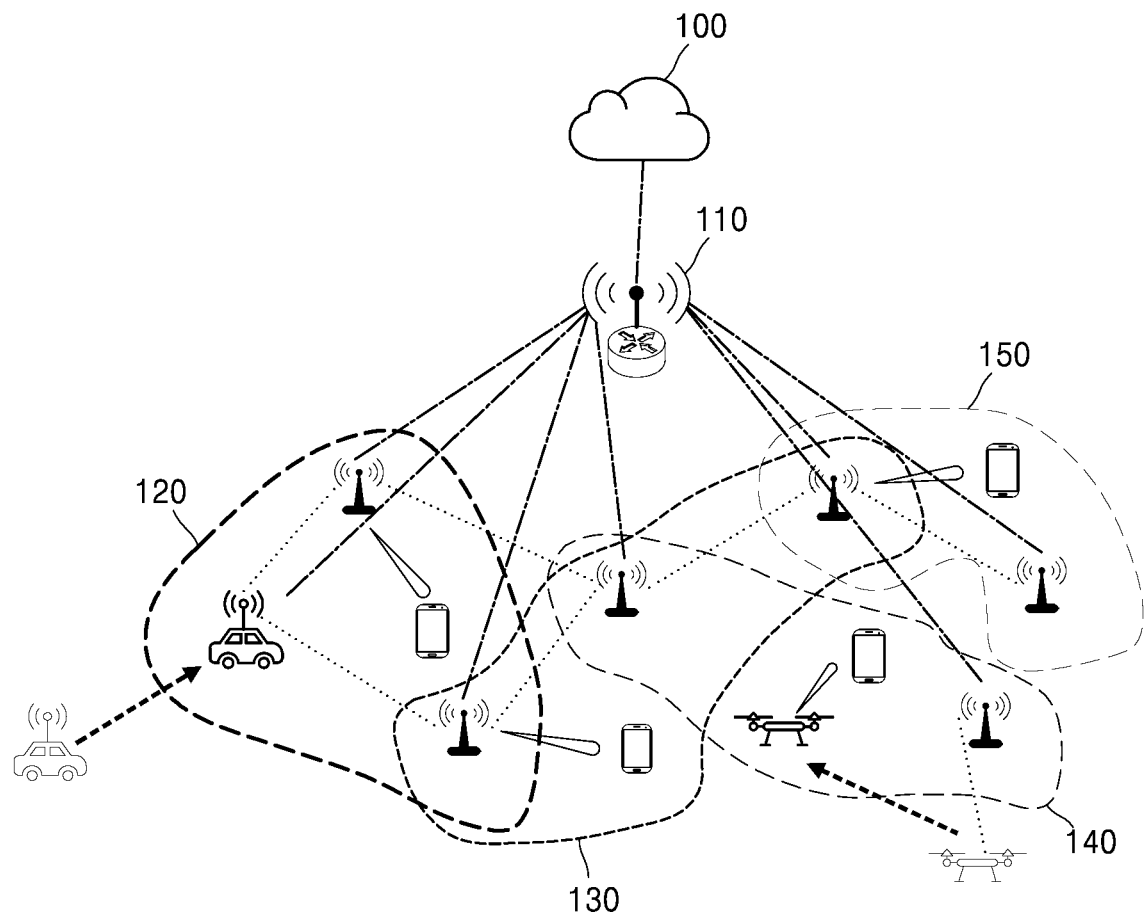
FIG. 1A illustrates a structure in which intelligent base stations form an intelligent base station group, based on a terminal, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description of embodiments of the disclosure, descriptions of techniques that are well known in the art and not directly related to the disclosure are omitted.

This is to clearly convey the gist of the disclosure by omitting any unnecessary explanation.

For the same reason, some elements in the drawings are exaggerated, omitted, or schematically illustrated. Also, actual sizes of respective elements are not necessarily represented in the drawings. In the drawings, the same or corresponding elements are denoted by the same reference numerals.

The advantages and features of the disclosure and methods of achieving the advantages and features will become apparent with reference to embodiments of the disclosure described in detail below with reference to the accompanying drawings. The disclosure may, however, be embodied in many different forms and should not be construed as being limited to the embodiments of the disclosure set forth herein; rather, these embodiments of the disclosure are provided so that this disclosure will be thorough and complete, and will fully convey the concept of the disclosure to one of ordinary skill in the art. The scope of the disclosure only defined in the claims. Throughout the specification, like reference numerals or characters refer to like elements.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, and the like.

In the disclosure, a controller may also be referred to as a processor.

In the disclosure, a layer (or a layer apparatus) may also be referred to as an entity.

It will be understood that each block of flowchart illustrations and combinations of blocks in the flowchart illustrations may be implemented by computer program instructions. These computer program instructions may be provided to a processor of a general-purpose computer, special purpose computer, or other programmable data processing equipment, such that the instructions, which are executed via the processor of the computer or other programmable data processing equipment, generate means for performing functions specified in the flowchart block(s). These computer program instructions may also be stored in a computer-usable or computer-readable memory that may direct a computer or other programmable data processing equipment to function in a particular manner, such that the instructions stored in the computer-usable or computer-readable memory produce a manufactured article including instruction means that perform the functions specified in the flowchart block(s). The computer program instructions may also be loaded onto a computer or other programmable data processing equipment to cause a series of operations to be performed on the computer or other programmable data processing equipment to produce a computer-executable process such that the instructions that are executed on the computer or other programmable data processing equipment provide operations for implementing the functions specified in the flowchart block or blocks.

In addition, each block may represent a module, segment, or portion of code, which includes one or more executable instructions for implementing specified logical function(s). It should also be noted that in some alternative implementations, the functions noted in the blocks may occur out of the presented order. For example, two blocks shown in succession may in fact be executed substantially concurrently or the blocks may sometimes be executed in the reverse order, according to the functionality involved.

The term 'unit' or '~er(or)' used in the embodiments of the disclosure indicates a software component or a hardware component such as a Field Programmable Gate Array (FPGA) or an Application-Specific Integrated Circuit (ASIC), and the term 'unit' or '~er(or)' performs certain roles. However, the term 'unit' or '~er(or)' is not limited to software or hardware. The term 'unit' or '~er(or)' may be configured to be included in an addressable storage medium or to reproduce one or more processors. Thus, the term 'unit' or '~er(or)' may include, by way of example, object-oriented software components, class components, and task components, and processes, functions, attributes, procedures, subroutines, segments of a program code, drivers, firmware, a micro code, a circuit, data, a database, data structures, tables, arrays, and variables. Functions provided by components and 'units' or '~ers(ors)' may be combined into a smaller number of components and 'units' or '~ers(ors)' or may be further separated into additional components and 'units' or '~ers(ors)'. In addition, the components and 'units' or '~ers (ors)' may be implemented to operate one or more central processing units (CPUs) in a device or a secure multimedia card.

As used in the following description, terms identifying access nodes, terms indicating network entities, terms indicating messages, terms indicating interfaces between network entities, terms indicating various types of identification information, etc. are exemplified for convenience of explanation. Accordingly, the disclosure is not limited to terms to be described later, and other terms representing objects having the equivalent technical meaning may be used.

For convenience of description below, in the disclosure, terms and names defined in a standard for 5G, new radio (NR), or long term evolution (LTE) systems are used. However, the disclosure is not limited to the terms and names but may also be identically applied to systems that comply with other standards.

In other words, in specifically describing embodiments of the disclosure, the 3rd Generation Partnership Project (3GPP) will mainly target a communication standard that defines a standard, but the main subject matter of the disclosure is also applicable to other communication systems having similar technical backgrounds via a slight modification that does not greatly depart from the scope of the disclosure, the slight modification being determined by one of ordinary skill in the art to which the disclosure pertains.

Communication systems including up to 5G or NR systems operate based on a cell that is a certain range around one base station. In other words, a terminal needs to be connected to one cell in order to receive a network service from a base station. When the terminal deviates from the range of a cell currently receiving a network service and moves to another cell, the terminal may perform a process for receiving a network service from the other cell through a handover operation. When the terminal detects that the power of a reference signal received from another cell is greater than the power of a reference signal received from a currently connected cell, the terminal may transmit a measurement report to a base station of the current cell and perform a handover operation. In response to the measurement report from the terminal, the base station may transmit a handover command message to the terminal and may interrupt data transmission to the terminal. The terminal may perform a random access to a new cell and receive a network service from the new cell.

However, it is expected that the size of a cell gradually decrease and the number of base stations increases due to the use of higher frequency bands (e.g., mmWave bands) in the communication systems including up to the 5G or NR systems. As an ultra-dense network is configured due to an increase in the number of base stations, the quality of service (QoS) of a terminal may deteriorate because the terminal undergoes a frequent handover process. Accordingly, a user-centric ultra-dense network (UUDN) technology has been proposed in which a plurality of base stations form a group with respect to a terminal and the plurality of base stations in the group support network services to the terminal, rather than an existing cell-based operation. However, the UUDN may need a central controller that monitors the states of terminals and base stations and determines base stations which are to be included in a base station group for a specific terminal, in order to create a base station group that supports the terminal. A central controller such as a baseband unit (BBU) pool or a local service center (LSC) in a cloud-radio access network (C-RAN) structure may perform functions of configuring/reconfiguring a base station group according to, for example, the mobility of terminals and the channel statuses of the terminals and the base stations, and scheduling the data of the terminals. Presence of this central controller may cause additional base stations to be provided, and thus the complexity of a network may be further increased. Because the provision of a plurality of fixed-type base stations is a factor that hinders an efficient ultra-dense network operation, a cell-less network structure that performs optimization of a distributed-based network through cooperative operations with neighboring base stations without intervention of a central controller is needed.

Accordingly, a method and apparatus for forming an optimal base station group for a terminal through distributed cooperation with neighboring base stations in a mobile communication system will now be described. A method and apparatus for more efficiently operate a UUDN by using a mobile node will also be described.

Figure 1B:
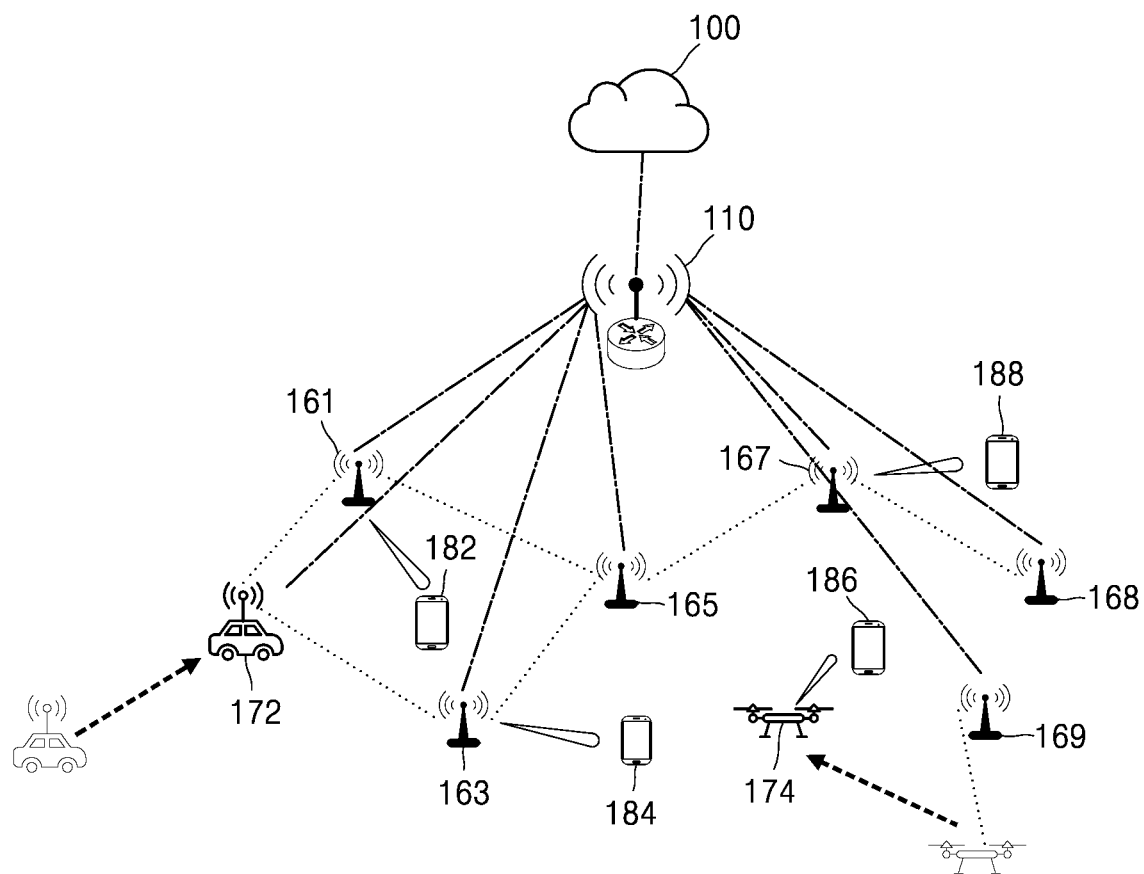
FIG. 1B illustrates a structure in which intelligent base stations form an intelligent base station group, based on a terminal, according to an embodiment of the disclosure.

FIGS. 1A and 1B illustrate a structure in which intelligent base stations form an intelligent base station group, based on a terminal, according to various embodiments of the disclosure.

Referring to FIGS. 1A and 1B, a first intelligent base station 161, a second intelligent base station 163, and a first mobile base station 172 may form a first intelligent base station group 120 to support a first terminal 182. The second intelligent base station 163, a third intelligent base station 165, and a fourth mobile base station 167 may form a second intelligent base station group 130 to support a second terminal 184. The third intelligent base station 165, a second mobile base station 174, and a sixth intelligent base station 169 may form a third intelligent base station group 140 to support a third terminal 186. The fourth intelligent base station 167 and a fifth intelligent base station 168 may form a fourth intelligent base station group 150 to support a fourth terminal 188. According to an embodiment of the disclosure, the first through sixth intelligent base stations 161, 163, 165, 167, 168, and 169 and the first and second mobile base stations 172 and 174 may form a wired or wireless backhaul link with a gateway node 110. The gateway node 110 may transmit data stored in a server 100 to an intelligent node that transmits data to a terminal, via the wired or wireless backhaul link.

According to an embodiment of the disclosure, an intelligent base station within an intelligent base station group may determine whether reconfiguration of the intelligent base station group is necessary, according to movement information of a terminal. When the intelligent base station determines that reconfiguration of the intelligent base station group is necessary, the intelligent base station may transmit a join request to join in the intelligent base station group to a nearby intelligent base station not included in the intelligent base station group. In response to the join request, the intelligent base station may receive a join approval message from the nearby intelligent base station. Based on the join approval message, the intelligent base station may reconfigure the intelligent base station group.

For example, according to movement information of the third terminal 186, the sixth intelligent base station 169 within the third intelligent base station group 140 may determine whether reconfiguration of the third intelligent base station group 140 is necessary. When the sixth intelligent base station 169 determines that reconfiguration of the third intelligent base station group 140 is necessary, the sixth intelligent base station 169 may transmit a join request to join in the third intelligent base station group 140 to the second mobile base station 174 corresponding to a nearby intelligent base station not included in the third intelligent base station group 140. In response to the join request, the sixth intelligent base station 169 may receive a join approval message from the second mobile base station 174. Based on the join approval message, the sixth intelligent base station 169 may reconfigure the third intelligent base station group 140 by including the second mobile base station 174 in the third intelligent base station group 140.

According to an embodiment of the disclosure, due to use of an intelligent base station capable of optimizing a network through self-judgment, a network including an intelligent base station may efficiently control data traffic of mobile phones, the number of which geometrically increases. In addition, due to use of a cell-less network structure, a single terminal may transceive data with a plurality of intelligent base stations not only transceiving data with only one base station. Accordingly, the terminal may perform a handover, a less number of times, and may secure a network QoS that is uniform on time and/or space.

According to an embodiment of the disclosure, the first through sixth intelligent base stations 161, 163, 165, 167, 168, and 169 and the first and second mobile base stations 172 and 174 may be base stations that transmit the data of terminals to the terminals via an access link in the cell-less network structure. In contrast with the UUDN technology of managing the entire network by using a central controller, the plurality of intelligent base stations may dispersively perform operations for network optimization, such as data transmission, scheduling, and network reconfiguration, on a terminal via mutual cooperation without a central controller. According to an embodiment of the disclosure, an intelligent base station may reduce the complexity of a calculation of a QoS and the like by autonomously optimizing a network for a terminal without central controllers. In other words, in contrast with a centralized structure that collects information about all terminals and all base stations in a central controller and constitutes a base station group, intelligent base stations are distributed and cooperatively operate with each other, so that a problem related to the complexity of a calculation of a QoS or the like may be addressed.

According to an embodiment of the disclosure, each intelligent base station may have a unique identifier. A plurality of intelligent base stations may form an intelligent base station group to provide a network service to a specific user terminal. The plurality of intelligent base stations that form the intelligent base station group for the specific user terminal may share a single intelligent base station group identifier. The intelligent base station group identifier may be used by a terminal to connect to a network. For example, the identifier of an intelligent base station may be an ID of the intelligent base station, and the ID of an intelligent base station group may be a logical group ID. According to types, intelligent base stations may be the first through sixth intelligent base stations 161, 163, 165, 167, 168, and 169 fixed to specific locations or may be the first and second mobile base stations 172 and 174 that are movable without being geographically fixed. For example, the first and second mobile base stations 172 and 174 may take types such as automobiles, autonomous vehicles, and drones, but embodiments of the disclosure are limited thereto.

According to an embodiment of the disclosure, the first and second mobile base stations 172 and 174 may include communication equipment and antenna that may move without existing at a geographically fixed location and may serve as intelligent base stations. The first and second mobile base stations 172 and 174 may include, but are not limited to, automobiles, autonomous vehicles, and drones. The first and second mobile base stations 172 and 174 may include a mobile base station of which a location may be controlled by a communication service provider, and a mobile base station of which a location may not be controlled by the communication service provider. In other words, the first and second mobile base stations 172 and 174 may include both a personal mobile vehicle used as a mobile base station, such as an automobile, an autonomous vehicle, and a personal drone, and a mobile vehicle capable of providing a network service by fluidly arranging a mobile base station at a specific location, such as an autonomous vehicle and a drone that a communication service provider operates. According to an embodiment of the disclosure, intelligent base stations may include the first and second mobile base stations 172 and 174.

According to an embodiment of the disclosure, reconfiguration of an intelligent base station group may include a process in which some or all of the intelligent base stations included in an intelligent base station group that supports a single terminal are withdrawn from the intelligent base station group or one or more nearby intelligent base stations join an intelligent base station group that supports a single terminal. For example, reconfiguration of an intelligent base station group may include a process in which a new nearby intelligent base station joins an intelligent base station group in order to support a specific terminal, a process in which an intelligent base station is withdrawn from an intelligent base station group that supports a single terminal, and a process in which an intelligent base station is withdrawn from an intelligent base station group that supports a single terminal and at the same time a nearby intelligent base station joins the intelligent base station group. An intelligent base station group may be reconfigured when an intelligent base station senses the necessity of reconfiguring the intelligent base station group, such as when the QoS of a terminal degrades according to a distance between an intelligent base station of the intelligent base station group and the terminal according to movement information of the terminal, or when the QoS of the terminal supported by the intelligent base station group degrade due to an increase in the traffic of other terminals supported by the intelligent base station of the intelligent base station group, but embodiments of the disclosure are not limited thereto.

According to an embodiment of the disclosure, the gateway node 110 may transmit data received from the server 100 to an intelligent node that transmits data to a terminal via an access link required by a terminal, via the wired or wireless backhaul link. According to an embodiment of the disclosure, because the gateway node 110 does not control a connection between a terminal and an intelligent node and does not control formation of an intelligent node group by a plurality of intelligent nodes for the terminal, a network may be free from the centralized structure. The gateway node 110 may store information about an intelligent base station group. For example, the information about the intelligent base station group may include identifier information of each of the intelligent base stations that form the intelligent base station group for a specific terminal. When a reconfiguration event where an intelligent base station group is newly formed occurs, the gateway node 110 may receive information about the new intelligent base station group from the intelligent base stations within the intelligent base station group and may update the identifier of the intelligent base station group for the specific terminal. When an intelligent node joins a network to operate as a new intelligent base station, the gateway node 110 may allocate a new intelligent base station identifier for the intelligent node. The intelligent node may be a communication device that is operable as an intelligent base station not yet joined in the network. According to an embodiment of the disclosure, the gateway node 110 may store a group of intelligent base station identifiers that may be used by the intelligent base stations. The gateway node 110 may allocate an intelligent base station identifier that is currently not allocated, to an intelligent base station newly joined in a network or a mobile base station capable of being fluidly joined in and withdrawn from the network.

According to another embodiment of the disclosure, the gateway node 110 may previously allocate, to an existing intelligent base station, a group of intelligent base station identifiers for an intelligent base station that is to newly join a network. Accordingly, when a new intelligent base station or a mobile base station joins in a network, an intelligent base station within the intelligent base station group may allocate the identifier of the new intelligent base station to the new intelligent base station without using the gateway node 110. The intelligent base station within the intelligent base station group may transmit information about the allocated identifier to the gateway node 110 in order to transmit allocated identifier information about which new intelligent node' identifier has been allocated to the gateway node 110. According to an embodiment of the disclosure, the intelligent base station may allocate an identifier to a new intelligent node and then immediately transmit information about the allocated identifier to the gateway node 110. According to another embodiment of the disclosure, the intelligent base station that has allocated an identifier may transmit information about the allocated identifier when an intelligent node allocated the identifier starts an operation of supporting a terminal as an intelligent base station. However, a time point when the intelligent base station transmits the allocated identifier information to the gateway node 110 is not limited to the above-described examples.

According to an embodiment of the disclosure, the first through sixth intelligent base stations 161, 163, 165, 167, 168, and 169 and the first and second mobile base stations 172 and 174 may be connected to the single gateway node 110 in a wireless network structure. The gateway node 110 may receive data to be transmitted to a terminal from the server 100 and transmit the received data to one or more intelligent base stations capable of providing a service to the terminal. For example, the gateway node 110 may receive data to be transmitted to the first terminal 182 from the server 100 and may transmit the received data to the first intelligent base station 161, which is an intelligent base station within the first intelligent base station group 120 that supports the first terminal 182. According to an embodiment of the disclosure, the gateway node 110 may be connected to the intelligent base stations 161, 163, 165, 167, 168, 169, 172, and 174 via a backhaul link. The backhaul link may be connected in a wired or wireless manner. The gateway node 110 may identify a specific intelligent base station by using the identifier of each intelligent base station.

According to an embodiment of the disclosure, a plurality of intelligent base stations connected to the single gateway node 110 may form a link for transceiving control signals with each other, as necessary. One or more intelligent base stations that support a single terminal, from among the plurality of intelligent base stations connected to the single gateway node 110, may form an intelligent base station group. For example, the first intelligent base station 161, the second intelligent base station 163, and the first mobile base station 172 connected to the gateway node 110 may form the first intelligent base station group 120 to support a network service to the first terminal 182. According to an embodiment of the disclosure, an intelligent base station group formed for one terminal may have an intelligent base station group identifier, and the intelligent base station group identifier may be maintained until the terminal terminates connection with a network.

According to an embodiment of the disclosure, a terminal may not be aware of which intelligent base stations the terminal is connected to. In other words, because the terminal may know only the identifier of the intelligent base station group and may not know the identifiers of the intelligent base stations included in the intelligent base station group, what intelligent base stations are included in the intelligent base station group that supports the terminal may not be known to the terminal. In a cell-based wireless communication method, information about the ID of a cell including a terminal should be maintained in order for the terminal to know which base station provides a network service. However, according to an embodiment of the disclosure, a terminal may know only the identifier of an intelligent base station group and may be made not know the identifiers of the intelligent base stations included in the intelligent base station group, and thus the terminal may reduce the complexity of calculations performed to receive data.

According to an embodiment of the disclosure, one intelligent base station may be included in a plurality of intelligent base station groups to support a plurality of terminals. In other words, one intelligent base station may have the identifiers of the plurality of intelligent base station groups to support the plurality of terminals, and each of the plurality of intelligent base station groups may provide a network service to each of the plurality of terminals. For example, the second intelligent base station 163 may be included in both the first intelligent base station group 120 for supporting the first terminal 182 and the second intelligent base station group 130 for supporting the second terminal 184. Accordingly, the second intelligent base station 163 may have the identifier of the first intelligent base station group 120 and the identifier of the second intelligent base station group 130 and may provide a network service to the first terminal 182 and the second terminal 184.

Although an intelligent base station and a mobile base station are separately illustrated in FIGS. 1A and 1B, embodiments of the disclosure are not limited thereto, and an intelligent base station may include a mobile base station.

Figure 2A:
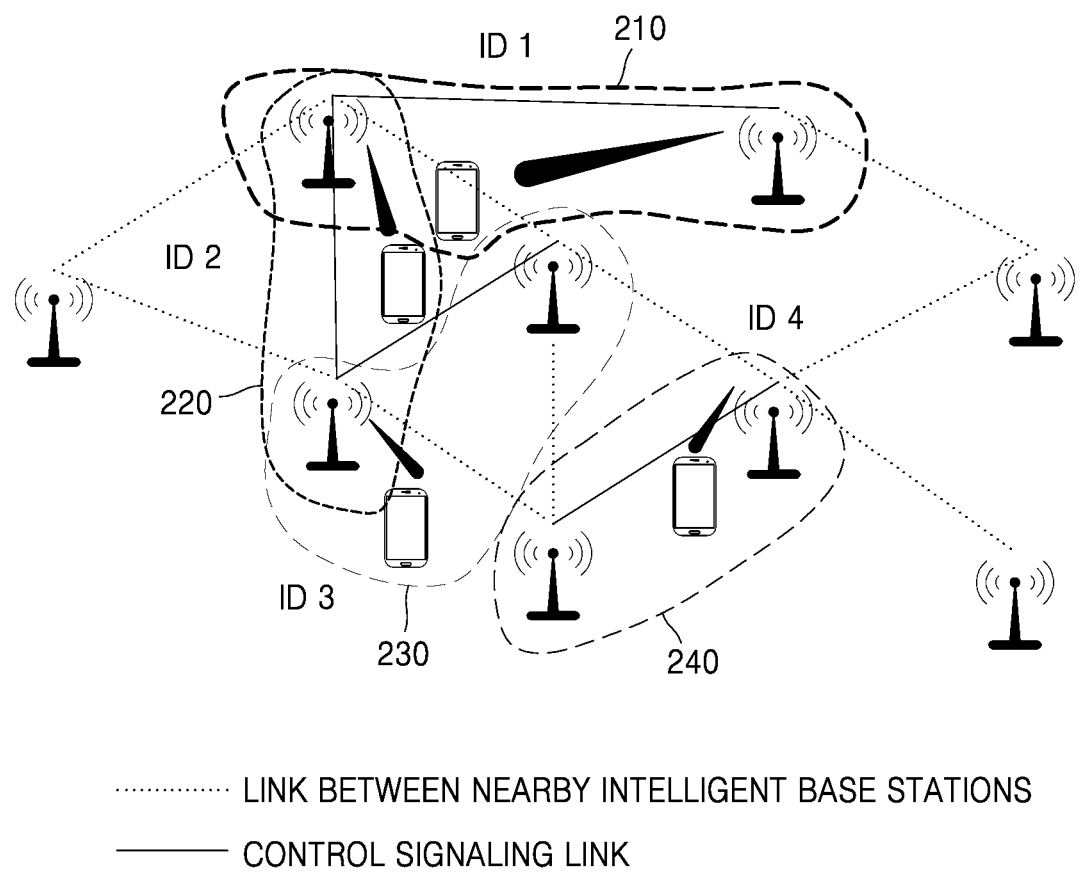
FIG. 2A illustrates a structure in which an intelligent base station forms a nearby intelligent base station link with a nearby intelligent base station, according to an embodiment of the disclosure.
Figure 2B:
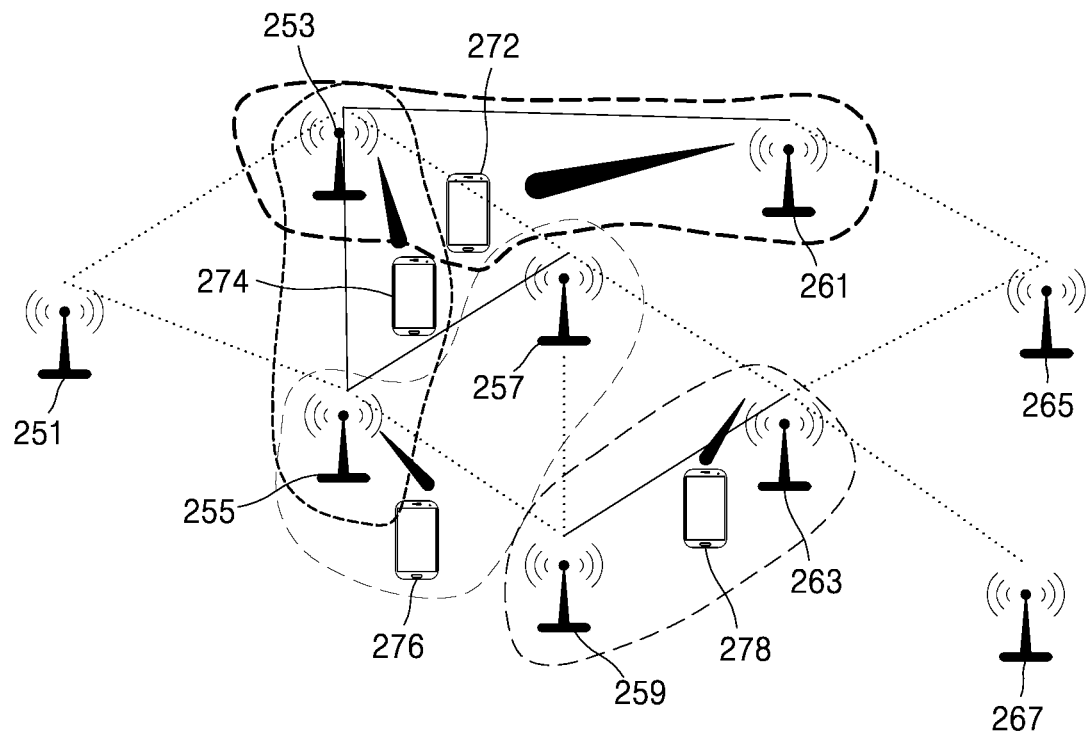
FIG. 2B illustrates a structure in which an intelligent base station forms a nearby intelligent base station link with a nearby intelligent base station, according to an embodiment of the disclosure.

FIGS. 2A and 2B illustrate a structure in which an intelligent base station forms a nearby intelligent base station link with a nearby intelligent base station, according to various embodiments of the disclosure.

Referring to FIGS. 2A and 2B, a plurality of intelligent base stations that form an intelligent base station group may form a link where the plurality of intelligent base stations may communicate with each other for exchange of control signals and information. In other words, the plurality of intelligent base stations that form the intelligent base station group may form a control signaling link for communicating with each other. According to an embodiment of the disclosure, the plurality of intelligent base stations that form the intelligent base station group may exchange network information through the control signaling link. The network information may include, but is not limited to, the number of terminals connected to each intelligent base station, the amount of traffic of a terminal(s) supported by each intelligent base station, the power of an uplink reference signal received by each intelligent base station, the QoS of the terminal(s) supported by each intelligent base station, a signal to noise ratio (SNR), and mobility information of a terminal predicted by each intelligent base station. An intelligent base station included in the intelligent base station group may form a nearby intelligent base station link capable of communicating a network with a nearby intelligent base station not included in the intelligent base station group, in order to exchange information necessary for reconfiguration.

For example, a second intelligent base station 253 and a sixth intelligent base station 261 that form a first intelligent base station group 210 to support a first terminal 272 may form a control signaling link. The second intelligent base station 253 included in the first intelligent base station group 210 may also form a control signaling link with a first intelligent base station 251 and a ninth intelligent base station 267 not included in the first intelligent base station group 210. In other words, the second intelligent base station 253 may form a control signaling link between nearby intelligent base stations together with the first intelligent base station 251 and the ninth intelligent base station 267. In addition to the first, second and ninth intelligent base stations 251, 253 and 267, a third to eighth intelligent base stations 255, 257, 259, 261, 263 and 265 are found in FIG. 2B. In addition to the first terminal 272, second to fourth terminals 274, 276 and 278 are also found in FIG. 2B.

According to an embodiment of the disclosure, because a network has a structure including no central controllers, an intelligent base station may perform a process for exchanging network information with another intelligent base station and optimizing the network. In order for an intelligent base station to conduct a process for optimizing a network, the intelligent base stations that constitute one intelligent base station group for one terminal may form a control signaling link with each other in order to exchange pieces of network information necessary for optimizing the network. For example, the network information may include, but is not limited to, the number of terminals connected to each intelligent base station, the overall amount of traffic of terminals supported by each intelligent base station, the power of a reference signal received from a terminal, an SNR, and mobility information of a terminal predicted by an intelligent base station.

According to an embodiment of the disclosure, the intelligent base stations that constitute the intelligent base station group may exchange pieces of state information of a network that are sensed or predicted by the intelligent base stations. Accordingly, an intelligent base station may perform a reconfiguration process to optimize an intelligent base station group, so that the QoS of a terminal may be continuously secured. When a network state varies due to, for example, movement of a terminal or a rapid change in a channel, intelligent base stations may cooperatively operate and determine that reconfiguration of a network is necessary, and consequently may exchange pieces of information of the intelligent base stations within an intelligent base station group and exchange information with a nearby intelligent base station, thereby forming a new intelligent base station group that supports a terminal. In other words, in contrast with the centralized structure of collecting information about all terminals and all base stations in a central controller and constituting a base station group, a plurality of intelligent base stations are distributed and cooperatively operate with each other, thereby performing operations for network optimization such as data transmission to a terminal, scheduling, and network reconfiguration. According to an embodiment of the disclosure, even when a new intelligent base station fluidly joins or leaves a network, a distributive and cooperative network structure realized by intelligent base stations may efficiently address expansion of a network.

According to an embodiment of the disclosure, an intelligent base station included in a specific intelligent base station group may form a nearby intelligent base station link in order to exchange information for network reconfiguration according to, for example, mobilities of a nearby intelligent base station not included in the intelligent base station group and a terminal and a change in a channel between the terminal and the intelligent base station. For example, in case an intelligent base station group for providing a network service to a specific terminal is formed, when a nearby intelligent base station needs to join the intelligent base station group due to mobility of the specific terminal or a change in a channel state between the specific terminal and the intelligent base station, the network information may be exchanged through a control signaling link between the intelligent base station and the nearby intelligent base station that constitute the intelligent base station group. In other words, the control signaling link between the intelligent base station of the intelligent base station group and the nearby intelligent base station may be used to join the nearby intelligent base station in the intelligent base station group according to the mobility of the terminal. According to an embodiment of the disclosure, when the intelligent base station of the intelligent base station group determines that reconfiguration of the intelligent base station group is necessary, the intelligent base station may transmit a join request message indicating a request to join the intelligent base station group to the nearby intelligent base station. The intelligent base station may receive a join approval message in response to the join request. The join approval message may include, but is not limited to, at least one of the amount of traffic of the nearby intelligent base station, the power of the uplink reference signal received by the nearby intelligent base station from the terminal, or an SNR.

According to an embodiment of the disclosure, the plurality of intelligent base stations that form the single intelligent base station group for the specific terminal may share a single intelligent base station group identifier. The intelligent base station group identifier may be used by a terminal to connect to a network. For example, the intelligent base station group identifier may be a logical group ID. The first intelligent base station group 210 may be allocated a logical group ID of D 1, the second intelligent base station group 220 may be allocated a logical group ID of ID 2, the third intelligent base station group 230 may be allocated a logical group ID of ID 3, and the fourth intelligent base station group 240 may be allocated a logical group ID of ID 4. Accordingly, the second terminal 274 may use ID 2, which is the identifier of the second intelligent base station group 220, to connect with a network. A terminal may be aware of only the identifier of an intelligent base station group that supports the terminal, and may not be informed of which intelligent base stations are included in the intelligent base station group.

Figure 3:
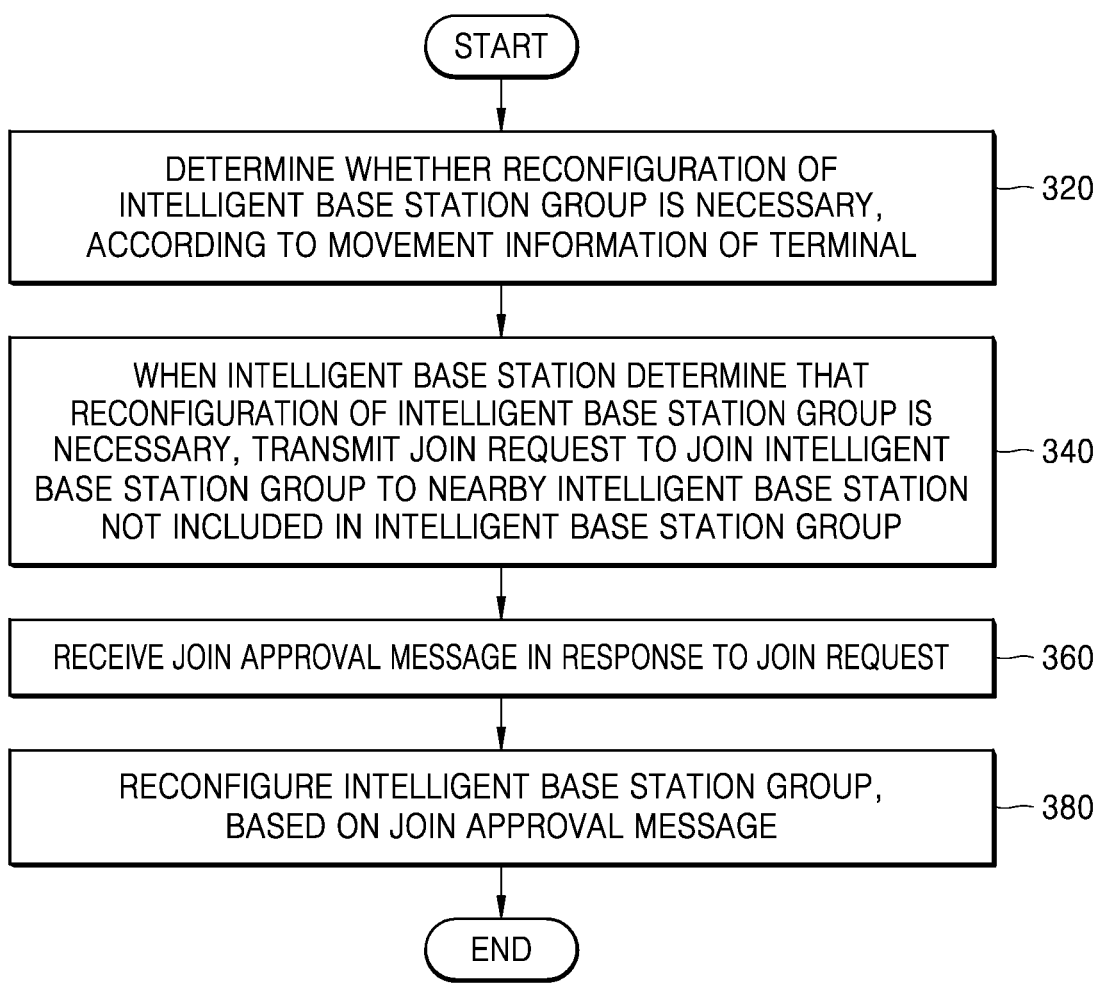
FIG. 3 is a flowchart of an operation method of a first intelligent base station for determining joining of a nearby intelligent base station in an intelligent base station group, in a wireless communication system, according to an embodiment of the disclosure.

FIG. 3 is a flowchart of an operation method of a first intelligent base station for determining joining of a nearby intelligent base station in an intelligent base station group, in a wireless communication system, according to an embodiment of the disclosure.

Referring to FIG. 3, in operation 320, an intelligent base station in an intelligent base station group may determine whether reconfiguration of the intelligent base station group is necessary, according to movement information of a terminal. A representative intelligent base station exists among the intelligent base stations that constitute the intelligent base station group and thus only the representative intelligent base station may determine whether reconfiguration of the intelligent base station group is necessary. Alternatively, no representative intelligent base stations exist, and thus each of the intelligent base stations of the intelligent base station group may determine whether reconfiguration of the intelligent base station group is necessary.

According to an embodiment of the disclosure, the representative intelligent base station may exist among the intelligent base stations that constitute the intelligent base station group, and thus only the representative intelligent base station may perform a process of reconfigure the intelligent base station group. Accordingly, an intelligent base station(s) other than the representative intelligent base station that constitutes the intelligent base station group may transmit network information sensed by the intelligent base station(s) to the representative intelligent base station periodically or non-periodically or according to event occurrence. The network information that the other intelligent base station(s) transmits to the representative intelligent base station may include, but is not limited to, the power of an uplink reference signal received from the terminal supported by the intelligent base station group, an SNR, information about the overall amount of traffic of a terminal(s) supported by the other intelligent base station, and all pieces of information related to the QoS of the terminal transmitted by the intelligent base station group. The representative intelligent base station may determine whether it is necessary to reconfigure the intelligent base station group, by using the network information received from the other intelligent base station. For example, a first intelligent base station within the intelligent base station group may be the representative intelligent base station. The first intelligent base station may receive network information necessary for determining whether it is necessary to reconfigure the intelligent base station group, from a second intelligent base station within the intelligent base station group, and may determine whether it is necessary to reconfigure the intelligent base station group, based on the received network information. The network information may include the power of an uplink reference signal received by the second intelligent base station from a terminal, an SNR, the amount of traffic of the terminal, and the QoS of the terminal.

According to another embodiment of the disclosure, the representative intelligent base station may not exist. In other words, all of the intelligent base stations included in the intelligent base station group without representative intelligent base stations may perform a process of reconfiguring the intelligent base station group. For example, when the second intelligent base station included in the intelligent base station group senses or predicts a degradation of the QoS of the terminal supported by the intelligent base station group, the second intelligent base station may determine that reconfiguration of the intelligent base station group is necessary.

In operation 340, when the intelligent base station determines that reconfiguration of the intelligent base station group is necessary, the intelligent base station may transmit a join request to join the intelligent base station group to a nearby intelligent base station not included in the intelligent base station group. The join request may include, but is not limited to, the ID of a reference signal that the terminal is to send, and information about a resource and time to transmit the reference signal that the terminal is to send.

According to an embodiment of the disclosure, when the representative intelligent base station determines that reconfiguration of the intelligent base station group is necessary, the representative intelligent base station may transmit a trigger message for network reconfiguration to the terminal. The representative intelligent base station may transmit a join request to join the intelligent base station group to the nearby intelligent base station through a control signaling link formed with the nearby intelligent base station.

According to another embodiment of the disclosure, when the second intelligent base station determines that it is necessary to reconfigure the intelligent base station group, without the representative intelligent base station, the second intelligent base station may transmit a trigger message for network reconfiguration to the terminal supported by the intelligent base station group and all of the intelligent base stations that constitute the intelligent base station group, and may transmit a join request to join the intelligent base station group to the nearby intelligent base station.

In operation 360, the intelligent base station may receive a join approval message from the nearby intelligent base station in response to the join request. According to an embodiment of the disclosure, the join approval message may include, but is not limited to, information about the overall amount of traffic of the nearby intelligent base station, the power of the uplink reference signal received from the terminal, and SNR information, in addition to a join approval signal as a result of the determination that the nearby intelligent base station joins the intelligent base station group.

In operation 380, the intelligent base station may reconfigure the intelligent base station group, based on the join approval message. According to an embodiment of the disclosure, when the intelligent base station determines based on the join approval message that joining of the nearby intelligent base station is favorable to a terminal currently supported by the intelligent base station group, the intelligent base station may determine joining of the nearby intelligent base station in the intelligent base station group. For example, when the intelligent base station determines that the QoS of the terminal increases when the nearby intelligent base station joins, the intelligent base station determines joining of the nearby intelligent base station. Alternatively, when the intelligent base station determines, based on the join approval message, that joining of the nearby intelligent base station is not beneficial to the QoS of the terminal, the intelligent base station may refuse joining of the nearby intelligent base station. According to an embodiment of the disclosure, the intelligent base station may determine the nearby intelligent base station to be included in the intelligent base station group, based on the join approval message, transmit join information of the nearby intelligent base station to the nearby intelligent base station and a gateway node, and receive updated intelligent base station information from the gateway node.

Although not shown in FIG. 3, according to an embodiment of the disclosure, the first intelligent base station may form a control signaling link with another intelligent base station included in the intelligent base station group, and may exchange network information between the other intelligent base station and the terminal via the control signaling link. The network information may include, but is not limited to, the number of terminals connected to each of the intelligent base stations in the intelligent base station group, the amount of traffic of a terminal supported by each of the intelligent base stations in the intelligent base station group, the power of a received uplink reference signal, the QoS of the terminal supported by each of the intelligent base stations within the intelligent base station group, an SNR, and mobility information of the terminal predicted by each of the intelligent base stations in the intelligent base station group.

Although not shown in FIG. 3, according to an embodiment of the disclosure, the intelligent base station may select the first intelligent base station as a representative intelligent base station, based on scheduling information, a channel state information, and predicted mobility information of the terminal, and may transmit information about the first intelligent base station to another intelligent base station of the intelligent base station group.

Although not shown in FIG. 3, according to an embodiment of the disclosure, the first intelligent base station may determine whether to operate mobile communication equipment not included in the intelligent base station group as a mobile base station, and may allocate, to the mobile communication equipment, an identifier needed by the mobile communication equipment to operate as the mobile base station. In this case, the nearby intelligent base station may be a mobile base station.

Although not shown in FIG. 3, according to an embodiment of the disclosure, the first intelligent base station may transmit an operation request to operate as a mobile base station to the mobile communication equipment, receive an operation approval message from the mobile communication equipment, and determine whether to operate the mobile communication equipment as a mobile base station.

Although not shown in FIG. 3, according to an embodiment of the disclosure, the first intelligent base station may receive a network join request message from the mobile communication equipment, and transmit a network join approval message to the mobile communication equipment, based on the network join request message.

Although not shown in FIG. 3, according to an embodiment of the disclosure, as the first intelligent base station determines to operate the mobile communication equipment as a mobile base station, the first intelligent base station may allocate an identifier received at a request or previously received at a request to the mobile communication equipment.

Figure 4:
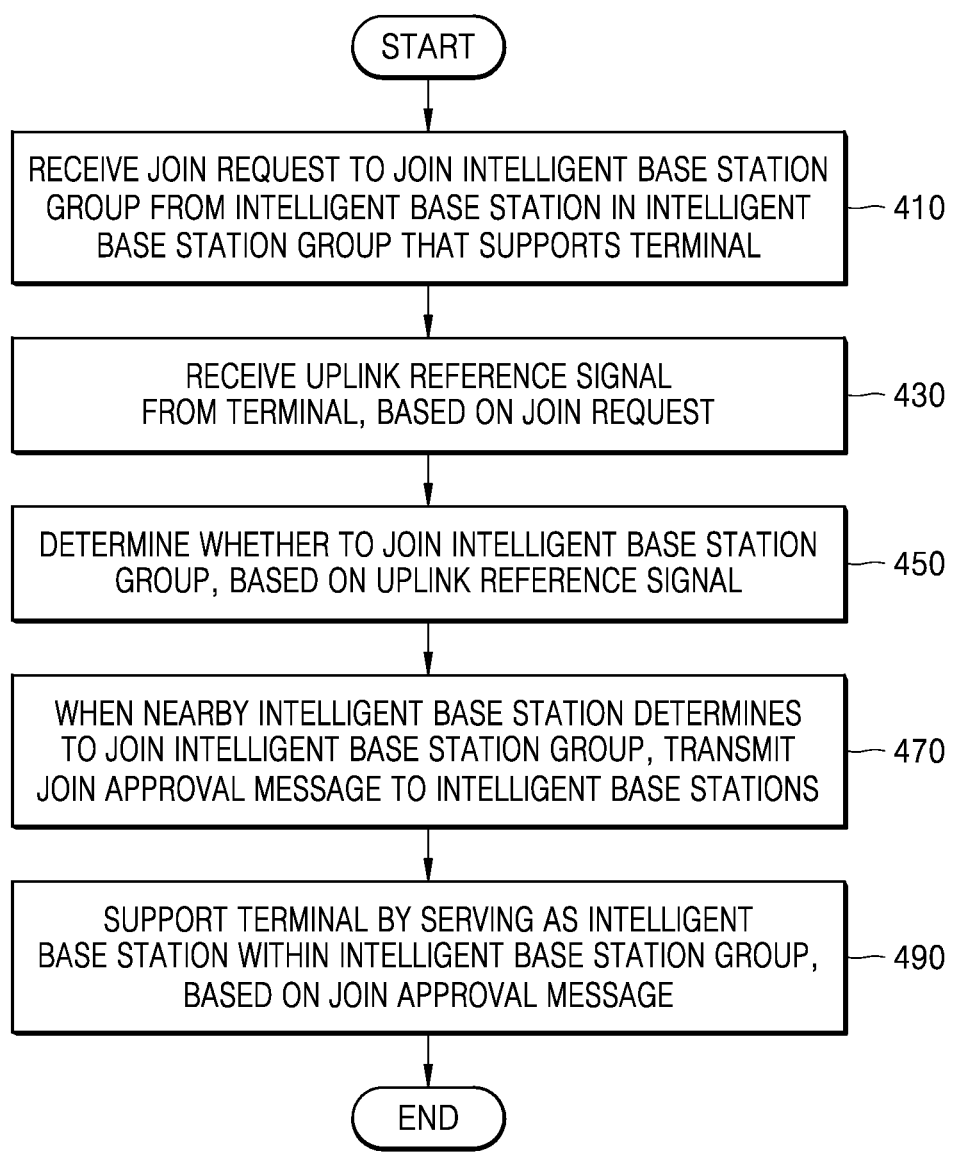
FIG. 4 is a flowchart of an operation method of a nearby intelligent base station in a wireless communication system for joining an intelligent base station group supporting a terminal, according to an embodiment of the disclosure.

FIG. 4 is a flowchart of an operation method of a nearby intelligent base station in a wireless communication system for joining an intelligent base station group supporting a terminal, according to an embodiment of the disclosure.

Referring to FIG. 4, in operation 410, a nearby intelligent base station may receive a join request to join the intelligent base station group from an intelligent base station in an intelligent base station group that supports a terminal.

According to an embodiment of the disclosure, the nearby intelligent base station may receive the join request through a control signaling link formed with the intelligent base station within the intelligent base station group that supports the terminal. The join request may include, but is not limited to, the ID of a reference signal that the terminal is to send, and information about a resource and time to transmit the reference signal.

In operation 430, based on the join request, the nearby intelligent base station may receive an uplink reference signal from the terminal. According to an embodiment of the disclosure, when the terminal receives a trigger message for network reconfiguration from the intelligent base station in the intelligent base station group, the terminal may transmit the uplink reference signal to the nearby intelligent base station by utilizing a resource, a time, and the like designated by the intelligent base station in the intelligent base station group. The nearby intelligent base station may receive the uplink reference signal from the terminal, based on at least one of the ID of the reference signal that the terminal is to send or information about the resource and time to transmit the reference signal. The uplink reference signal may be used by the nearby intelligent base station to predict the state of a channel with the terminal supported by the intelligent base station group.

In operation 450, based on the uplink reference signal, the nearby intelligent base station may determine whether to join the intelligent base station group. According to an embodiment of the disclosure, the nearby intelligent base station may determine whether to join the intelligent base station group, by predicting a channel state between the terminal and the nearby intelligent base station and determining whether formation of a new intelligent base station group by joining the intelligent base station group that supports the terminal is beneficial to the terminal or the nearby intelligent base station, by utilizing the predicted channel state, QoS information of the terminal, and information about an intelligent base station(s) that currently supports the terminal.

In operation 470, when the nearby intelligent base station determines to join the intelligent base station group, the nearby intelligent base station may transmit a join approval message to the intelligent base stations included in the intelligent base station group. According to an embodiment of the disclosure, the join approval message may include, but is not limited to, the overall amount of traffic of the current nearby intelligent base station, the power of the uplink reference signal received from the terminal, and SNR information in addition to a join approval signal acknowledgment (ACK).

In operation 490, based on the join approval message, the nearby intelligent base station may support the terminal by serving as an intelligent base station within the intelligent base station group. According to an embodiment of the disclosure, the intelligent base station included in the intelligent base station group may determine joining of the nearby intelligent base station in the intelligent base station group by determining whether the joining of the nearby intelligent base station is beneficial to the terminal, based on the join approval message received from the nearby intelligent base station. For example, when the intelligent base station determines that joining of the nearby intelligent base station in the intelligent base station group increases the QoS of the terminal, the intelligent base station may determine joining of the nearby intelligent base station. As the intelligent base station determines joining of the nearby intelligent base station, the nearby intelligent base station may be included in the intelligent base station group and may support the terminal by serving as an intelligent base station within the intelligent base station group.

Although not shown in FIG. 4, according to an embodiment of the disclosure, the nearby intelligent base station may receive join information of the nearby intelligent base station from the intelligent base station, based on the join approval message, and may receive information of an updated intelligent base station group from a gateway node.

Although not shown in FIG. 4, according to an embodiment of the disclosure, the nearby intelligent base station may determine whether to join the intelligent base station group, based on at least one of the QoS of the terminal or the amount of traffic of the nearby intelligent base station.

Although not shown in FIG. 4, according to an embodiment of the disclosure, the nearby intelligent base station may receive an operation request to operate as a mobile base station from the intelligent base station, determine whether to operate as a mobile base station, based on the operation request, and, when the nearby intelligent base station is determined to operate as a mobile base station, the nearby intelligent base station may transmit an operation approval message to the intelligent base station, and receive an identifier for operating as a mobile base station and information of neighboring intelligent base stations from the intelligent base station within the intelligent base station group. Accordingly, the nearby intelligent base station may be a mobile base station not included in the intelligent base station group.

Although not shown in FIG. 4, according to an embodiment of the disclosure, the nearby intelligent base station may determine whether to operate as a mobile base station, based on at least one of the QoS of mobile communication equipment or traffic of a network, and, when the nearby intelligent base station is determined to operate as a mobile base station, the nearby intelligent base station may transmit a network join request message to the intelligent base station, and receive an identifier for operating as a mobile base station and information of neighboring intelligent base stations from the intelligent base station within the intelligent base station group.

Figure 5:
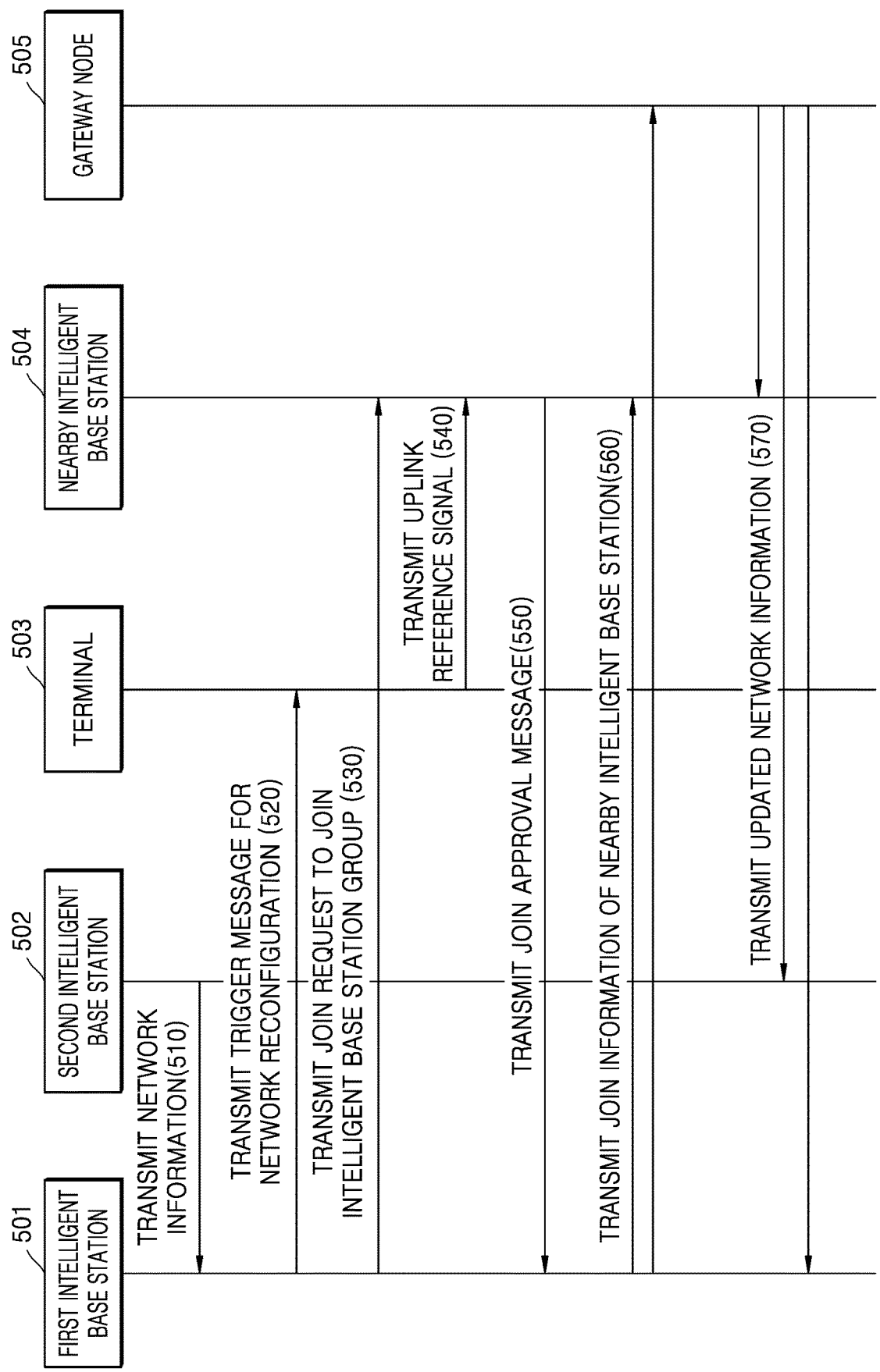
FIG. 5 is a flowchart of an operation, performed by a first intelligent base station, of receiving network information from a second intelligent base station and reconfiguring an intelligent base station group, according to an embodiment of the disclosure.

FIG. 5 is a flowchart of an operation, performed by a first intelligent base station, of receiving network information from a second intelligent base station and reconfiguring an intelligent base station group, according to an embodiment of the disclosure.

Referring to FIG. 5, a first intelligent base station 501 and a second intelligent base station 502 may be intelligent base stations that constitute a single intelligent base station group, and the first intelligent base station 501 may be a representative intelligent base station of the intelligent base station group. The first intelligent base station 501 may receive information of all of the other intelligent base stations that constitute the intelligent base station group, as the representative intelligent base station, and may transmit a trigger message for network reconfiguration to a terminal According to an embodiment of the disclosure, another intelligent base station may be the representative intelligent base station after there is a change in the state of a network or reconfiguration of the network is completed. According to another embodiment of the disclosure, the existing representative intelligent base station may serve as a representative intelligent base station even after reconfiguration of the network is completed. The representative intelligent base station may be selected based on whether a terminal 503 has been scheduled, a channel state information received from the terminal 503, and information of predicted mobility of the terminal 503. For example, the representative intelligent base station may be selected based on whether a nearby intelligent base station link is formed with nearby intelligent base stations existing in a direction where the terminal 503 moves. Also, the representative intelligent base station may be selected based on whether most nearby intelligent base station links are formed with the nearby intelligent base stations. However, a method of selecting the representative intelligent base station is not limited thereto.

According to an embodiment of the disclosure, when the representative intelligent base station is changed based on scheduling information, channel state information, and the like, a new representative intelligent base station may inform all of the other intelligent base stations of the intelligent base station group that the representative intelligent base station has been changed, through a control signaling link. According to another embodiment of the disclosure, when the representative intelligent base station has been changed based on mobility prediction information of the terminal 503, the intelligent base station serving as the existing representative intelligent base station may change the representative intelligent base station by using the mobility prediction information of the terminal 503, and may transmit information of the new representative intelligent base station to all of the intelligent base stations of the intelligent base station group through a control signaling link. Accordingly, the new representative intelligent base station may transmit ACK, and thus the representative intelligent base station may be changed.

In operation 510, the second intelligent base station 502 of the intelligent base station group may transmit network information to the first intelligent base station 501, which is the representative intelligent base station. According to an embodiment of the disclosure, the second intelligent base station 502 may periodically or non-periodically transmit network information sensed by the second intelligent base station 502 to the first intelligent base station 501. The network information may include, but is not limited to, the power of an uplink reference signal received from the terminal 503, an SNR, information of the overall amount of traffic of terminals supported by the second intelligent base station, and information related to the QoS of the terminal 503.

In operation 520, when the first intelligent base station 501 determines based on the network information that reconfiguration of the intelligent base station group is necessary, the first intelligent base station 501 may transmit a trigger message for network reconfiguration to the terminal 503. In operation 530, the first intelligent base station 501 may transmit, to a nearby intelligent base station 504 not included in the intelligent base station group, a join request to join the intelligent base station group, through a control signaling link formed with the nearby intelligent base station 504. According to an embodiment of the disclosure, the join request may include, but is not limited to, the identifier of an uplink reference signal that the terminal 503 is to send, and information about a resource and time to transmit the uplink reference signal.

In operation 540, when the terminal 503 receives the trigger message for network reconfiguration from the first intelligent base station 501, the terminal 503 may transmit the uplink reference signal to the nearby intelligent base station 504 by utilizing the resource and the time designated by the first intelligent base station 501. According to an embodiment of the disclosure, the uplink reference signal may be used when the nearby intelligent base station 504 not included in the intelligent base station group predicts a channel state with the terminal 503. The nearby intelligent base station 504 may predict the state of a channel between the terminal 503 and the nearby intelligent base station 504, based on the uplink reference signal. The nearby intelligent base station 504 may determine whether joining the intelligent base station group that supports the terminal 503 is beneficial to the network, based on the channel state information, the QoS information of the terminal 503, information of the first and second intelligent base stations 501 and 502 supporting the terminal 503, the QoS of a terminal (not shown) currently supported by the nearby intelligent base station 504, and information of an intelligent base station (not shown) that supports the terminal (not shown) currently supported by the nearby intelligent base station 504.

In operation 550, when the nearby intelligent base station 504 determines that joining the intelligent base station group is beneficial to the network, the nearby intelligent base station 504 may transmit a join approval message to the first intelligent base station 501. According to an embodiment of the disclosure, the join approval message may include, but is not limited to, ACK as a join approval signal, information about the overall amount of traffic of the nearby intelligent base station 504, the power of the uplink reference signal received from the terminal 503, and SNR information. When the first intelligent base station 501 determines that the QoS of the terminal 503 may be improved, based on the join approval message, the first intelligent base station 501 may determine joining of the nearby intelligent base station 504 in the intelligent base station group.

In operation 560, after the first intelligent base station 501 determines joining of the nearby intelligent base station 504 in the intelligent base station group, the first intelligent base station 501 may transmit join information of a nearby intelligent base station to the nearby intelligent base station 504 and a gateway node 505 to inform that the intelligent base station group has been reconfigured. The gateway node 505, which store information of all intelligent base stations, may store the identifier of the nearby intelligent base station 504 as information of an intelligent base station included in the intelligent base station group that supports the terminal 503.

In operation 570, the gateway node 505 may transmit network information including updated group information to the nearby intelligent base station 504 and the intelligent base station(s) of the intelligent base station group that supports the terminal 503. According to an embodiment of the disclosure, the gateway node 505 may transmit updated network information including an updated intelligent base station group list, and may inform all of the intelligent base stations supporting the terminal 503 that the intelligent base station group has been reconfigured.

Figure 6:
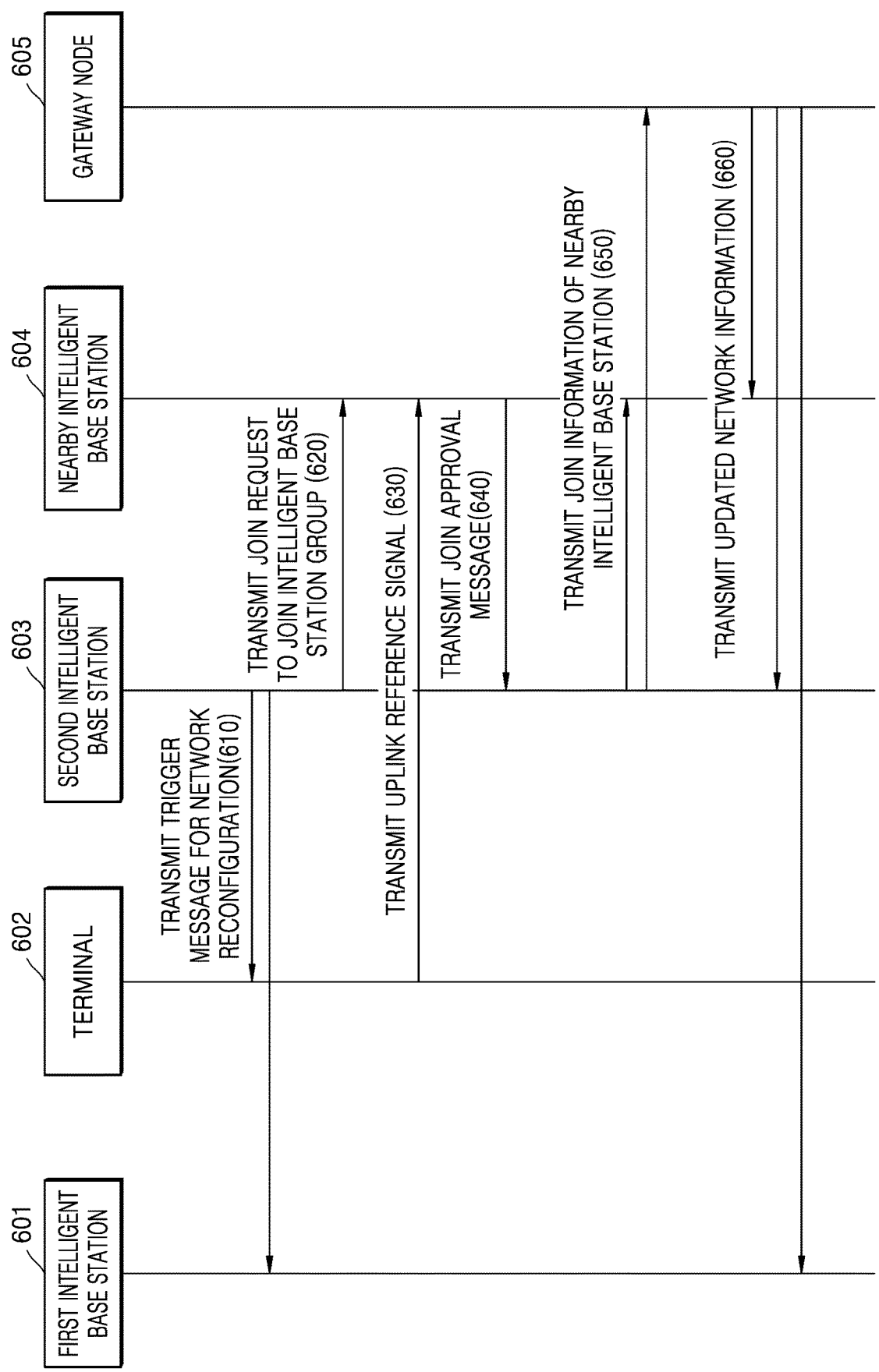
FIG. 6 is a flowchart of an operation, performed by a second intelligent base station, of reconfiguring an intelligent base station group, without a representative intelligent base station, according to an embodiment of the disclosure.

FIG. 6 is a flowchart of an operation, performed by a second intelligent base station, of reconfiguring an intelligent base station group, without a representative intelligent base station, according to an embodiment of the disclosure.

Referring to FIG. 6, a first intelligent base station 601 and a second intelligent base station 603 may be intelligent base stations included in a single intelligent base station group, and the first intelligent base station 601 and the second intelligent base station 603 may be intelligent base stations of an intelligent base station group not including a representative intelligent base station. According to an embodiment of the disclosure, the second intelligent base station 603 may reconfigure the intelligent base station group.

In operation 610, when the second intelligent base station 603 senses a need to reconfigure the intelligent base station group, the second intelligent base station 603 may transmit a trigger message for network reconfiguration to a terminal 602 and all of the intelligent base stations that constitute the intelligent base station group. For example, when the second intelligent base station 603 senses or predicts a degradation of the QoS of the terminal 602, the second intelligent base station 603 may transmit the trigger message for network reconfiguration to the terminal 602 and all of the intelligent base stations that constitute the intelligent base station group.

In operation 620, after transmitting the trigger message for network reconfiguration to the terminal 602, the second intelligent base station 603 may transmit a join request to join the intelligent base station group to a nearby intelligent base station 604 capable of newly joining the intelligent base station group, through a control signaling link. According to an embodiment of the disclosure, the join request may include, but is not limited to, the identifier of an uplink reference signal that the terminal 602 is to send, and information about a resource and time to transmit the uplink reference signal.

In operation 630, the terminal 602 may transmit the uplink reference signal to the nearby intelligent base station 604 by utilizing the resource and time designated by the second intelligent base station 603. According to an embodiment of the disclosure, the uplink reference signal may be used by the nearby intelligent base station 604 to predict a channel state with the terminal 602. The nearby intelligent base station 604 may predict a channel state between the terminal 602 and the nearby intelligent base station 604, based on the uplink reference signal, and may determine whether joining of the nearby intelligent base station 604 in the intelligent base station group is beneficial to the network, based on, for example, the predicted channel state and the QoS of the terminal 602.

In operation 640, when the nearby intelligent base station 604 determines that joining the intelligent base station group is beneficial to the network, the nearby intelligent base station 604 may transmit a join approval message to the second intelligent base station 603. The join approval message may include, but is not limited to, ACK as a join approval signal, information about the overall amount of traffic of the nearby intelligent base station 604, the power of the uplink reference signal received from the terminal 602, and SNR information. The second intelligent base station 603 may determine, based on the join approval message, whether the joining of the nearby intelligent base station 604 improves the QoS of the terminal 602.

In operation 650, the second intelligent base station 603 may determine joining of the nearby intelligent base station 604 in the intelligent base station group by determining that the joining of the nearby intelligent base station 604 improves the QoS of the terminal 602, and may transmit join information of the nearby intelligent base station 604 to the nearby intelligent base station 604 and a gateway node 605. According to an embodiment of the disclosure, operation 650 may correspond to operation 560 described above with reference to FIG. 5.

In operation 660, the gateway node 605 may transmit updated network information to the nearby intelligent base station 604 and all of the intelligent base stations that constitute the intelligent base station group including the first intelligent base station 601 and the second intelligent base station 603. According to an embodiment of the disclosure, operation 660 may correspond to operation 570 described above with reference to FIG. 5.

Figure 7:
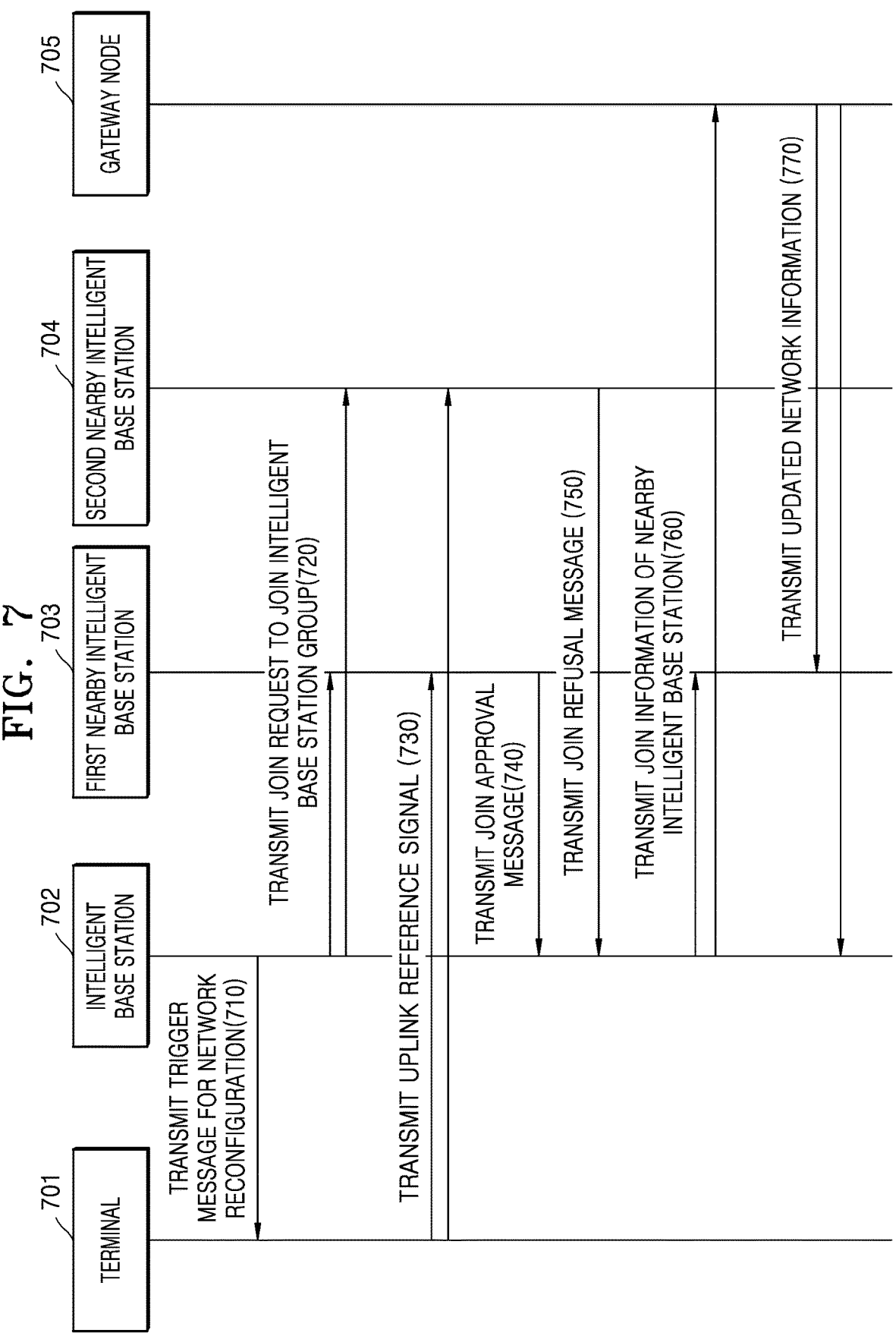
FIG. 7 is a flowchart of an operation, performed by a plurality of nearby intelligent base stations, of determining joining of an intelligent base station when the plurality of nearby intelligent base stations receive a join request, according to an embodiment of the disclosure.

FIG. 7 is a flowchart of an operation, performed by a plurality of nearby intelligent base stations, of determining joining of an intelligent base station when the plurality of nearby intelligent base stations receive a join request, according to an embodiment of the disclosure.

Referring to FIG. 7, an intelligent base station 702 of an intelligent base station group may determine whether the intelligent base station group needs to be reconfigured, according to movement information of a terminal 701. In operation 710, when the intelligent base station 702 determines that reconfiguration of the intelligent base station group is necessary, the intelligent base station 702 may transmit a trigger message for network reconfiguration to the terminal 701.

In operation 720, as the intelligent base station 702 determines that reconfiguration of the intelligent base station group is necessary, the intelligent base station 702 may transmit a join request to join the intelligent base station group to a first nearby intelligent base station 703 and a second nearby intelligent base station 704. Although only the first nearby intelligent base station 703 and the second nearby intelligent base station 704 are illustrated in FIG. 7, the first nearby intelligent base station 703 and the second nearby intelligent base station 704 are not essential components. The intelligent base station 702 may transmit the join request to nearby intelligent base stations numbering more than the first nearby intelligent base station 703 and the second nearby intelligent base station 704, or may transmit the join request to nearby intelligent base stations numbering fewer than the first nearby intelligent base station 703 and the second nearby intelligent base station 704. According to an embodiment of the disclosure, the intelligent base station 702 may transmit a join request to join the intelligent base station group to the first and second nearby intelligent base stations 703 and 704 capable of newly joining the intelligent base station group, through a control signaling link. The join request may include, but is not limited to, the identifier of an uplink reference signal that the terminal 701 is to send, and information about a resource and a time to transmit the uplink reference signal.

In operation 730, in response to the trigger message for network reconfiguration, the terminal 701 may transmit the uplink reference signal to the first and second nearby intelligent base stations 703 and 704 by utilizing the resource and time designated by the intelligent base station 702. According to an embodiment of the disclosure, the uplink reference signal may be used by the first and second nearby intelligent base stations 703 and 704 to predict a channel state with the terminal 701. The first and second nearby intelligent base stations 703 and 704 may predict a channel state between the terminal 701 and each of the first and second nearby intelligent base stations 703 and 704, based on the received uplink reference signal, and may determine whether joining of the first and second nearby intelligent base stations 703 and 704 in the intelligent base station group is beneficial to a network, based on, for example, the predicted channel state and the QoS of the terminal 701.

In operation 740, when the first nearby intelligent base station 703 determines that joining the intelligent base station group is beneficial to the network, the first nearby intelligent base station 703 may transmit a join approval message to the intelligent base station 702. In operation 750, when the second nearby intelligent base station 704 determines that joining the intelligent base station group is not beneficial to the network, the second nearby intelligent base station 704 may transmit a join refusal message to the intelligent base station 702.

According to an embodiment of the disclosure, the join approval message may include, but is not limited to, ACK as a join approval signal, information about the overall amount of traffic of the first nearby intelligent base station 703, the power of the uplink reference signal received from the terminal 701, and SNR information. The intelligent base station 702 may determine, based on the join approval message, whether the joining of the first nearby intelligent base station 703 improves the QoS of the terminal 701.

According to another embodiment of the disclosure, the join refusal message may include, but is not limited to, negative acknowledgment (NACK) as a join refusal signal, information about the overall amount of traffic of the second nearby intelligent base station 704, the power of the uplink reference signal received from the terminal 701, the power of an uplink reference signal received from another terminal supported by the intelligent base station 702 instead of the terminal 701, and SNR information. The intelligent base station 702 may transmit, to the second nearby intelligent base station 704, a join request message indicating a request to join an intelligent base station group for the terminal supported by the intelligent base station 702 instead of the terminal 701, by using the join refusal message received from the second nearby intelligent base station 704.

In operation 760, the intelligent base station 702 may determine joining of the first nearby intelligent base station 703 by determining that the joining of the first nearby intelligent base station 703 improves the QoS of the terminal 701, and may transmit join information of the first nearby intelligent base station 703 to the first nearby intelligent base station 703 and a gateway node 705. According to an embodiment of the disclosure, operation 760 may correspond to operation 560 described above with reference to FIG. 5.

In operation 770, the gateway node 705 may transmit updated network information to the first nearby intelligent base station 703 joined in the intelligent base station group and all of the intelligent base stations that constitute the intelligent base station group including the intelligent base station 702. According to an embodiment of the disclosure, operation 770 may correspond to operation 570 described above with reference to FIG. 5.

Figure 8:
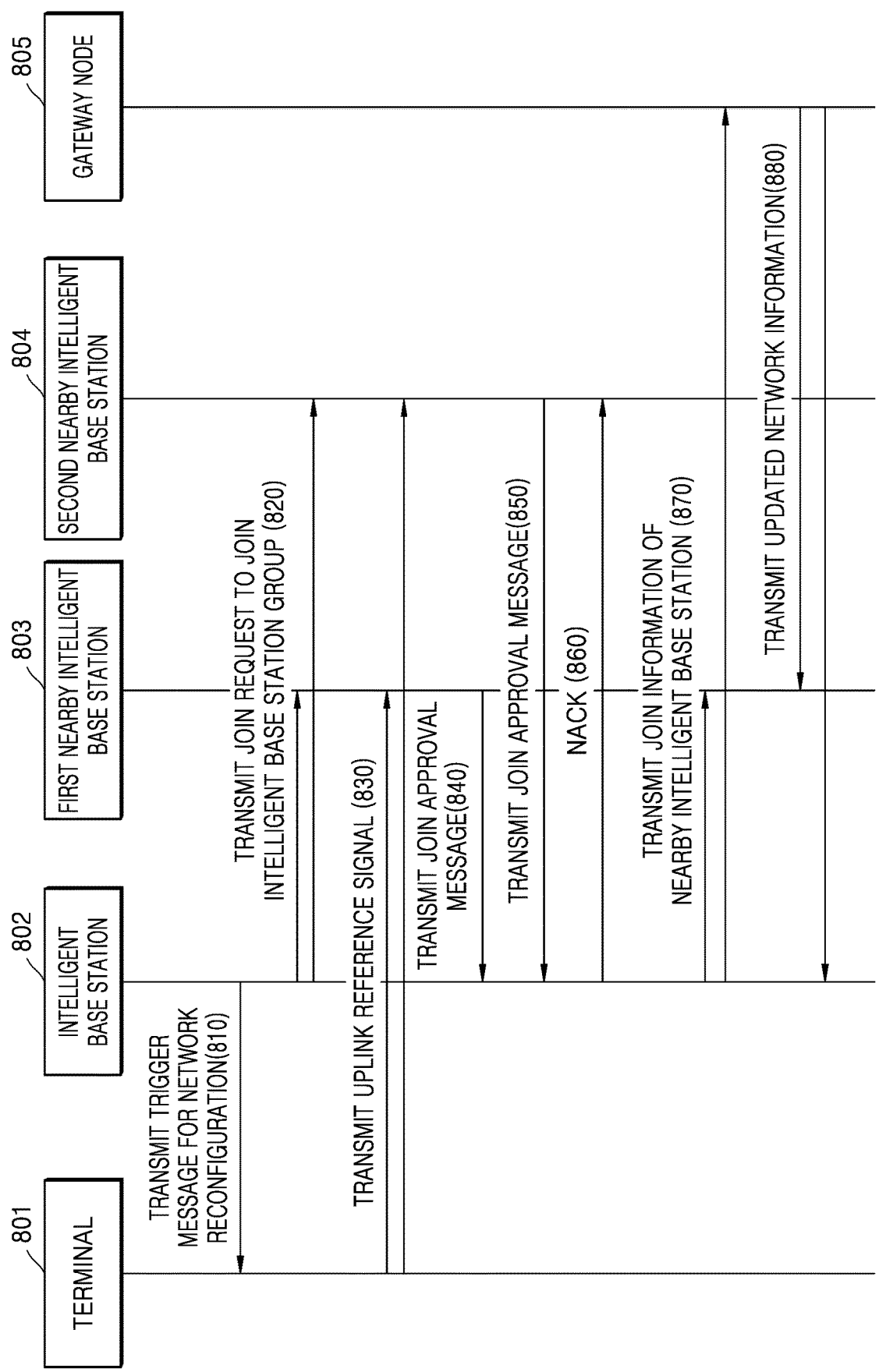
FIG. 8 is a flowchart of an operation of reconfiguring a network by selecting some from a plurality of nearby intelligent base stations when a join approval message is received from the plurality of nearby intelligent base stations, according to an embodiment of the disclosure.

FIG. 8 is a flowchart of an operation of reconfiguring a network by selecting some from a plurality of nearby intelligent base stations when a join approval message is received from the plurality of nearby intelligent base stations, according to an embodiment of the disclosure.

Referring to FIG. 8, an intelligent base station 802 that constitutes an intelligent base station group that supports a terminal 801 may determine whether the intelligent base station group needs to be reconfigured, according to movement information of the terminal 801. In operation 810, as the intelligent base station 802 determines that reconfiguration of the intelligent base station group is necessary, the intelligent base station 802 may transmit a trigger message for network reconfiguration to the terminal 801.

In operation 820, as the intelligent base station 802 determines that reconfiguration of the intelligent base station group is necessary, the intelligent base station 802 may transmit a join request to join the intelligent base station group to a first nearby intelligent base station 803 and a second nearby intelligent base station 804. Although only the first nearby intelligent base station 803 and the second nearby intelligent base station 804 are illustrated in FIG. 8, the first nearby intelligent base station 803 and the second nearby intelligent base station 804 are not essential components. The intelligent base station 802 may transmit a join request to more nearby intelligent base stations than the first nearby intelligent base station 803 and the second nearby intelligent base station 804, or may transmit a join request to less nearby intelligent base stations than the first nearby intelligent base station 803 and the second nearby intelligent base station 804. According to an embodiment of the disclosure, operation 820 may correspond to operation 720 described above with reference to FIG. 7.

In operation 830, in response to the trigger message for network reconfiguration, the terminal 801 may transmit an uplink reference signal to the first and second nearby intelligent base stations 803 and 804 by utilizing a resource and time designated by the intelligent base station 802. According to an embodiment of the disclosure, operation 830 may correspond to operation 730 described above with reference to FIG. 7.

In operations 840 and 850, when the first and second nearby intelligent base stations 803 and 804 determine that joining the intelligent base station group is beneficial to a network, the first and second nearby intelligent base stations 803 and 804 may transmit join approval messages to the intelligent base station 802, respectively. According to an embodiment of the disclosure, the join approval message may include, but is not limited to, information about the overall amount of traffic of each of the first and second nearby intelligent base stations 803 and 804, the power of the uplink reference signal received by each of the first and second nearby intelligent base stations 803 and 804 from the terminal 801, and SNR information, in addition to ACK as a join approval signal. The intelligent base station 802 may determine, based on the join approval message, whether the joining of the first and second nearby intelligent base stations 803 and 804 in the intelligent base station group improves the QoS of the terminal 801.

In operation 860, when the intelligent base station 802 determines that joining of the second nearby intelligent base station 804 does not improve the QoS of the terminal 801, based on the received join approval message, the intelligent base station 802 may refuse the joining of the second nearby intelligent base station 804 by transmitting NACK to the second nearby intelligent base station 804 or by transmitting no messages. According to an embodiment of the disclosure, the intelligent base station 802 may approve only joining of the first nearby intelligent base station 803, and may refuse joining of the second nearby intelligent base station 804. FIG. 8 illustrates only the first nearby intelligent base station 803 and the second nearby intelligent base station 804. However, the intelligent base station 802 may receive the join approval message from more or less nearby intelligent base stations than the first nearby intelligent base station 803 and the second nearby intelligent base station 804, and the intelligent base station 802 may determine, based on the join approval message, joining of some or all of the nearby intelligent base stations, which are capable of improving the QoS of the terminal 801 when joining the intelligent base station group, in the intelligent base station group. According to another embodiment of the disclosure, the intelligent base station 802 determines, based on the join approval message, that joining of all of the nearby intelligent base stations in the intelligent base station group does not improve the QoS of the terminal 801, and as a result the intelligent base station 802 may refuse the joining of all of the nearby intelligent base stations by transmitting NACK to all of the nearby intelligent base stations or by transmitting no messages.

In operation 870, the intelligent base station 802 determines joining of the first nearby intelligent base station 803 by determining that the joining of the first nearby intelligent base station 803 improves the QoS of the terminal 801, and may transmit join information of the first nearby intelligent base station 803 to the first nearby intelligent base station 803 and a gateway node 805. According to an embodiment of the disclosure, operation 870 may correspond to operation 560 described above with reference to FIG. 5.

In operation 880, the gateway node 805 may transmit updated network information to the first nearby intelligent base station 803 joined in the intelligent base station group and all of the intelligent base stations that constitute the intelligent base station group including the intelligent base station 802. According to an embodiment of the disclosure, operation 880 may correspond to operation 570 described above with reference to FIG. 5.

Figure 9:
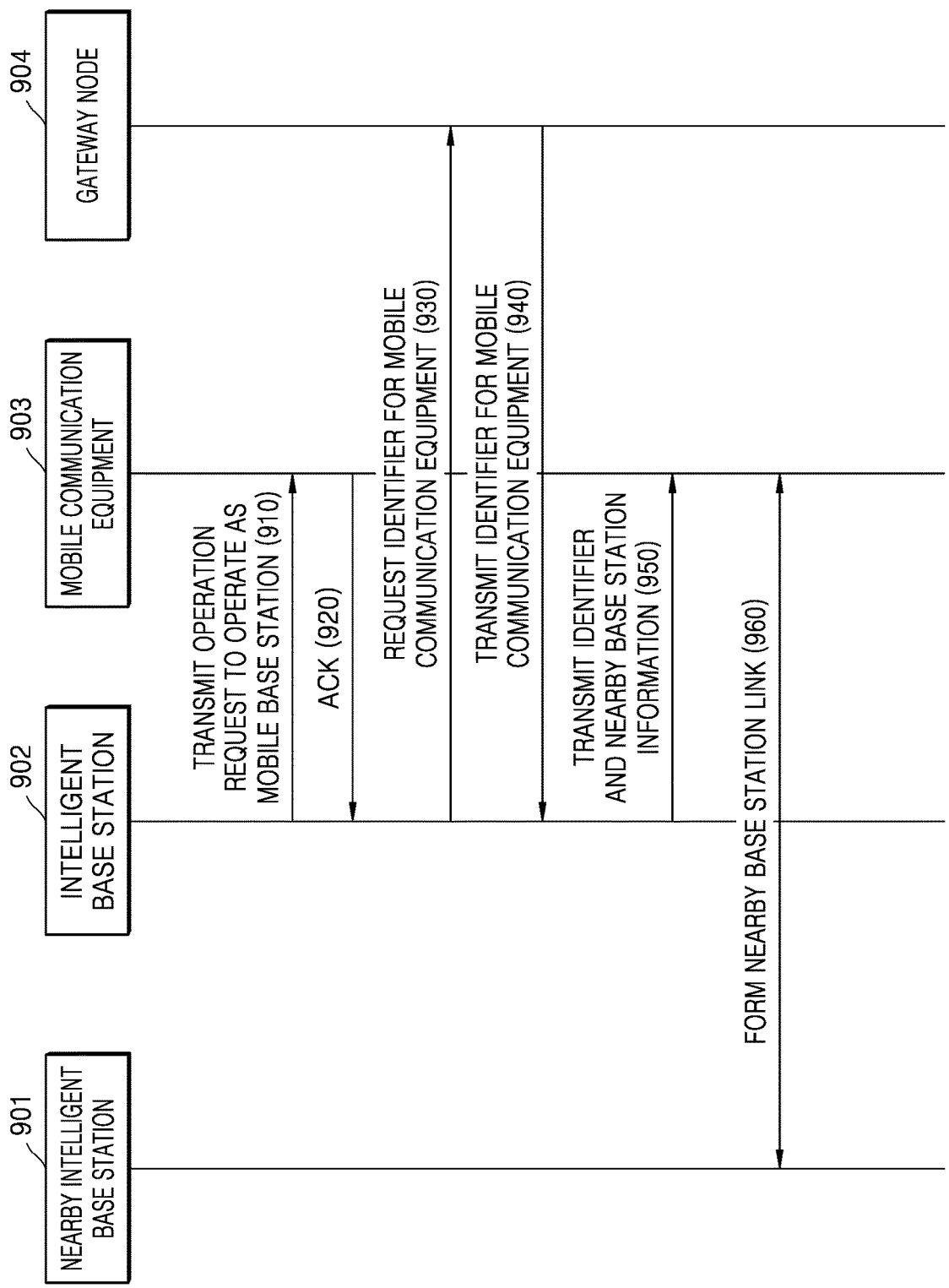
FIG. 9 is a flowchart of a method in which an intelligent base station enables mobile communication equipment to operate as a mobile base station, according to an embodiment of the disclosure.

FIG. 9 is a flowchart of a method in which an intelligent base station enables mobile communication equipment to operate as a mobile base station, according to an embodiment of the disclosure.

Referring to FIG. 9, mobile communication equipment 903 may include a vehicle capable of moving without existing at a geographically fixed location, such as an automobile, an autonomous vehicle, and a drone, and communication equipment and antenna capable of serving as an intelligent base station. According to an embodiment of the disclosure, when the mobile communication equipment 903 serves as an intelligent base station, the mobile communication equipment 903 may be referred to as a mobile base station. The mobile base station may include a mobile base station operable only as an intelligent base station, and a mobile base station capable of operating as a terminal receiving a network service and, as necessary, operating as an intelligent base station. The mobile base station may include a mobile base station of which a location may be controlled by a communication service provider, and a mobile base station of which a location may not be controlled by the communication service provider. In other words, both a mobile base station fluidly arranged at a specific location and capable of providing a network service, like an autonomous vehicle and a drone that are operated by a communication service provider, and a mobile base station capable of providing a network service, like a personal mobile vehicle such as an automobile, an autonomous vehicle, and a personal drone, may exist. According to an embodiment of the disclosure, an intelligent base station 902 may efficiently operate an ultra-dense network by using the mobile communication equipment 903 not physically fixed at a specific location. In other words, by using the mobile communication equipment 903 as an intelligent base station, the intelligent base station 902 may increase the density of an intelligent base station in a time or space that requires reduction of the traffic of data.

In operation 910, the intelligent base station 902 may transmit an operation request to operate as a mobile base station to the mobile communication equipment 903. According to an embodiment of the disclosure, the mobile communication equipment 903 may be mobile communication equipment capable of operating as a terminal receiving a network service and as necessary operating as an intelligent base station. When an additional intelligent base station is necessary in a network while the mobile communication equipment 903 is receiving a network service as a terminal, the mobile communication equipment 903 may receive the operation request to operate as a mobile base station from the intelligent base station 902.

In operation 920, when the mobile communication equipment 903 determines that it is able to operate as a mobile base station, the mobile communication equipment 903 may transmit ACK to the intelligent base station 902. According to an embodiment of the disclosure, in cases such as when the mobile communication equipment 903 determines, as a terminal, that the QoS thereof is sufficiently satisfied, and when the mobile communication equipment 903 determines that an additional intelligent base station is necessary due to an increase in data traffic in a current network, the mobile communication equipment 903 may transmit ACK to the intelligent base station 902. However, a case where the mobile communication equipment 903 determines that the mobile communication equipment 903 is able to operate as a mobile base station is not limited to the aforementioned cases. In other words, the mobile communication equipment 903 determines that the QoS thereof may be secured as a terminal and operating as a mobile base station is helpful to a network, the mobile communication equipment 903 may join as a mobile base station in the network.

In operation 930, the intelligent base station 902 may determine joining of the mobile communication equipment 903 in the network, and may request a gateway node 904 for an identifier for the mobile communication equipment 903. According to an embodiment of the disclosure, the identifier may be an identifier that may be allocated to the mobile communication equipment 903 in order for the mobile communication equipment 903 to operate as a mobile base station. For example, the identifier may be the ID of an intelligent base station that is to be allocated to the mobile communication equipment 903 operating as a mobile base station.

In operation 940, the gateway node 904 may transmit the identifier for the mobile communication equipment 903 to the intelligent base station 902. According to an embodiment of the disclosure, the gateway node 904 may allocate an identifier currently not allocated to another intelligent base station from a group of identifiers of intelligent base stations that may be flexibly allocated to the mobile communication equipment 903, and may transmit the allocated identifier to the intelligent base station 902. Accordingly, the intelligent base station 902 may transmit the allocated identifier to the mobile communication equipment 903. According to another embodiment of the disclosure, the gateway node 904 may transmit an identifier to the intelligent base station 902. Accordingly, the intelligent base station 902 may allocate the identifier to the mobile communication equipment 903.

In operation 950, the intelligent base station 902 may transmit, to the mobile communication equipment 903, the identifier received from the gateway node 904 and nearby base station information. According to an embodiment of the disclosure, the nearby base station information may include, but is not limited to, a location of and an identifier of a nearby intelligent base station around the mobile communication equipment 903.

In operation 960, the mobile communication equipment 903 may form a nearby base station link with a nearby intelligent base station 901, as a mobile base station. According to an embodiment of the disclosure, in order to form a control signaling link with the nearby intelligent base station 901, the mobile communication equipment 903 may transmit a request to form a nearby base station link to the nearby intelligent base station 901 having the identifier of the nearby intelligent base station included in the nearby base station information. In response to the request to form the nearby base station link, the nearby intelligent base station 901 may transmit a nearby base station link setting message to the mobile communication equipment 903, and thus the nearby base station link may be formed.

Figure 10:
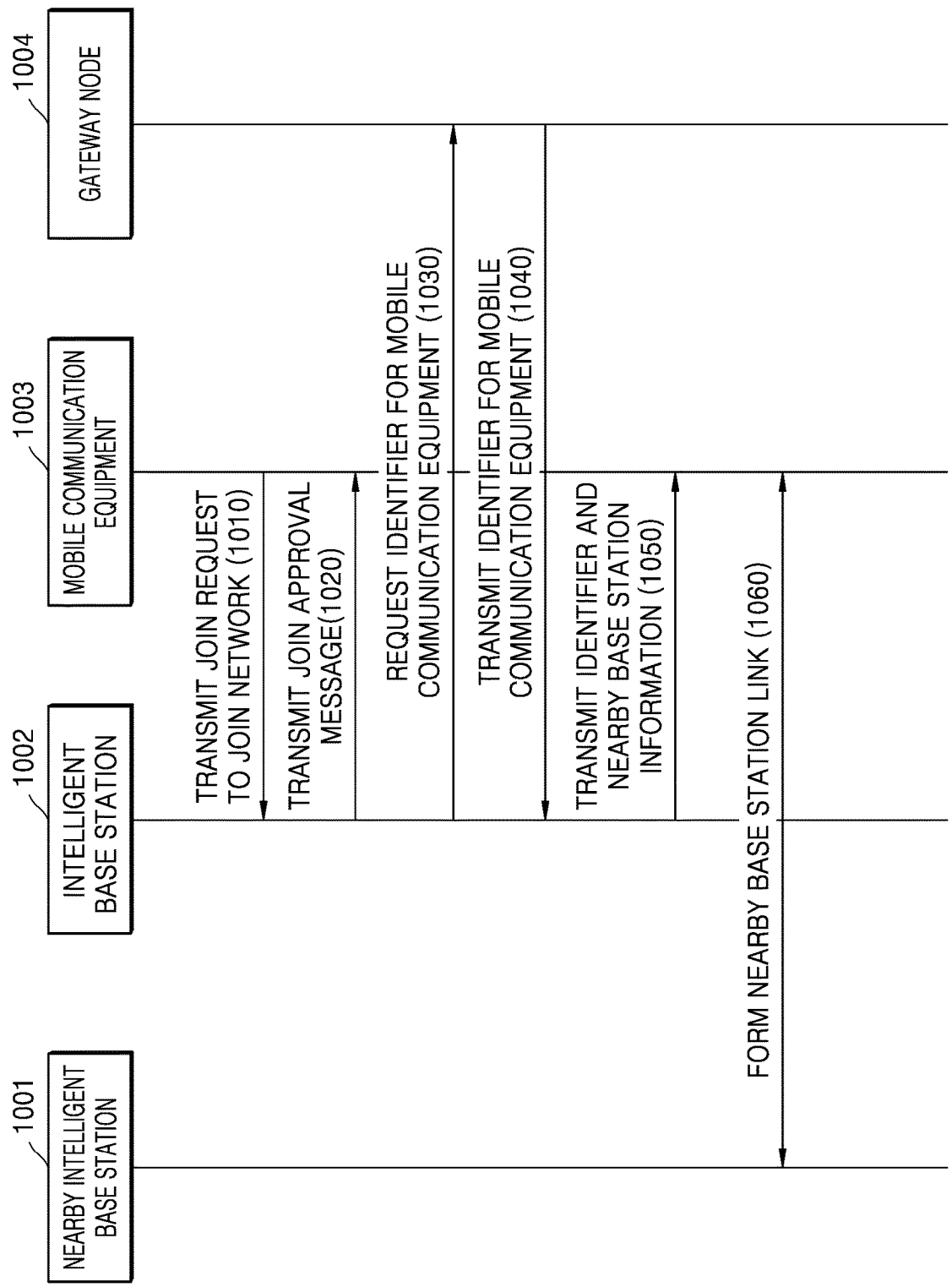
FIG. 10 is a flowchart of a method in which mobile communication equipment autonomously operates as a mobile base station, according to an embodiment of the disclosure.

FIG. 10 is a flowchart of a method in which mobile communication equipment autonomously operates as a mobile base station, according to an embodiment of the disclosure.

Referring to FIG. 10, in the method in which mobile communication equipment operates as a mobile base station, a mobile communication equipment 1003 may operate as a mobile base station by informing an intelligent base station 1002 that the mobile communication equipment 1003 is able to autonomously operate as a mobile base station, in contrast with the method of FIG. 9 in which the intelligent base station 902 enables the mobile communication equipment 903 to operate as a mobile base station by transmitting a request to operate as a mobile base station to the mobile communication equipment 903.

In operation 1010, the mobile communication equipment 1003 may transmit a join request to join a network to the intelligent base station 1002. According to an embodiment of the disclosure, the mobile communication equipment 1003 may determine that the mobile communication equipment 1003 is able to operate as a mobile base station when the QoS of the mobile communication equipment 1003 as a terminal is sufficiently secured, and as a result, the mobile communication equipment 1003 may transmit a join request to join the network to the intelligent base station 1002. According to another embodiment of the disclosure, the mobile communication equipment 1003 may determine that the QoS of itself or a neighboring terminal was degraded or may be degraded due to saturation of the network, and as a result, the mobile communication equipment 1003 may transmit a join request to join the network to the intelligent base station 1002. According to an embodiment of the disclosure, when the mobile communication equipment 1003 joins as a mobile base station in the network, the mobile communication equipment 1003 may receive its own data from a gateway node 1004 through a backhaul link. Accordingly, because the mobile communication equipment 1003 has a right to schedule its own data, the QoS of the mobile communication equipment 1003 may improve. Therefore, when the mobile communication equipment 1003 determines that its own QoS may be sufficiently secured or may be improved, the mobile communication equipment 1003 may determine to join as a mobile base station in the network, and may transmit a network join request to the intelligent base station 1002.

In operation 1020, the intelligent base station 1002 may determine that joining of the mobile communication equipment 1003 in the network improves the performance of the network, and as a result may transmit a join approval message to the mobile communication equipment 1003. According to another embodiment of the disclosure, the intelligent base station 1002 determines that joining of the mobile communication equipment 1003 in the network does not improve the performance of the network, and as a result may refuse the joining by transmitting a join refusal message to the mobile communication equipment 1003 or transmitting no messages.

In operation 1030, after determining joining of the mobile communication equipment 1003 in the network, the intelligent base station 1002 may request a gateway node 1004 for an identifier for the mobile communication equipment 1003. According to an embodiment of the disclosure, operation 1030 may correspond to operation 930 described above with reference to FIG. 9.

In operation 1040, the gateway node 1004 may transmit the identifier for the mobile communication equipment 1003 to the intelligent base station 1002. According to an embodiment of the disclosure, operation 1040 may correspond to operation 940 described above with reference to FIG. 9.

In operation 1050, the intelligent base station 1002 may transmit, to the mobile communication equipment 1003, the identifier received from the gateway node 1004 and nearby base station information. According to an embodiment of the disclosure, the nearby base station information may include, but is not limited to, a location of a nearby intelligent base station around the mobile communication equipment 1003 and an identifier of the nearby intelligent base station around the mobile communication equipment 1003.

In operation 1060, in response to the nearby base station information, the mobile communication equipment 1003 may form a nearby base station link with a nearby intelligent base station 1001, as a mobile base station. According to an embodiment of the disclosure, operation 1060 may correspond to operation 960 described above with reference to FIG. 9.

Figure 11:
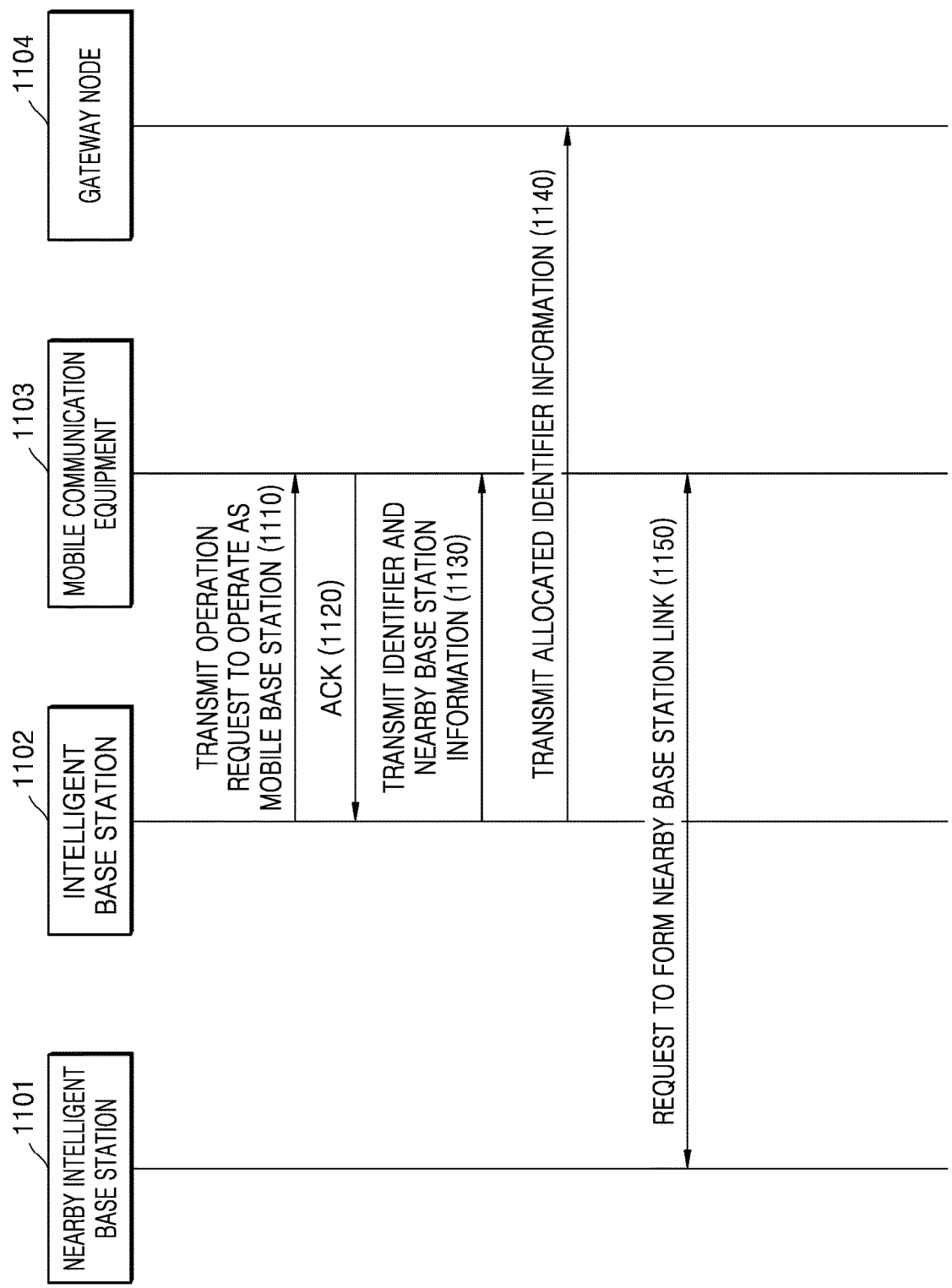
FIG. 11 is a flowchart of an operation of allocating one identifier within an identifier group to mobile communication equipment, when the identifier group, including identifiers to be allocated to a mobile base station, is previously received, according to an embodiment of the disclosure.

FIG. 11 is a flowchart of an operation of allocating one identifier within an identifier group to mobile communication equipment, when the identifier group, including identifiers to be allocated to a mobile base station, is previously received, according to an embodiment of the disclosure.

Referring to FIG. 11, a gateway node 1104 may previously transmit, to an intelligent base station 1102, an identifier group that may be used by mobile communication equipment 1103. According to an embodiment of the disclosure, when a representative intelligent base station exists, the gateway node 1104 may previously transmit, to the representative intelligent base station, the identifier group that may be used by mobile communication equipment 1103.

In operations 1110 and 1120, the intelligent base station 1102 may transmit a request to operate as a mobile base station to the mobile communication equipment 1103, and, when the mobile communication equipment 1103 determines that the mobile communication equipment 1103 is able to operate as a mobile base station, the mobile communication equipment 1103 may transmit ACK to the intelligent base station 1102. Operations 1110 and 1120 may correspond to operations 910 and 920 described above with reference to FIG. 9. According to an embodiment of the disclosure, operations 1110 and 1120 have been described as a process in which the intelligent base station 1102 requests the mobile communication equipment 1103 to operate as a mobile base station. However, according to another embodiment of the disclosure, in operations 1010 and 1020 described above with reference to FIG. 10, a process in which the mobile communication equipment 1103 transmits a network join request to the intelligent base station 1002 according to a determination by the mobile communication equipment 1103 may be performed instead of operations 1110 and 1120.

In operation 1130, the intelligent base station 1102 may allocate one identifier within the identifier group previously received from the gateway node 1104 to the mobile communication equipment 1103. In operation 1140, the intelligent base station 1102 may transmit the allocated identifier and nearby base station information to the mobile communication equipment 1103. According to an embodiment of the disclosure, the nearby base station information may include at least one of a location of a nearby intelligent base station around the mobile communication equipment 1103 or an identifier of the nearby intelligent base station around the mobile communication equipment 1103.

In operation 1150, in response to the nearby base station information, the mobile communication equipment 1103 may form a nearby base station link with a nearby intelligent base station 1101, as a mobile base station. According to an embodiment of the disclosure, operation 1150 may correspond to operation 960 described above with reference to FIG. 9.

Figure 12:
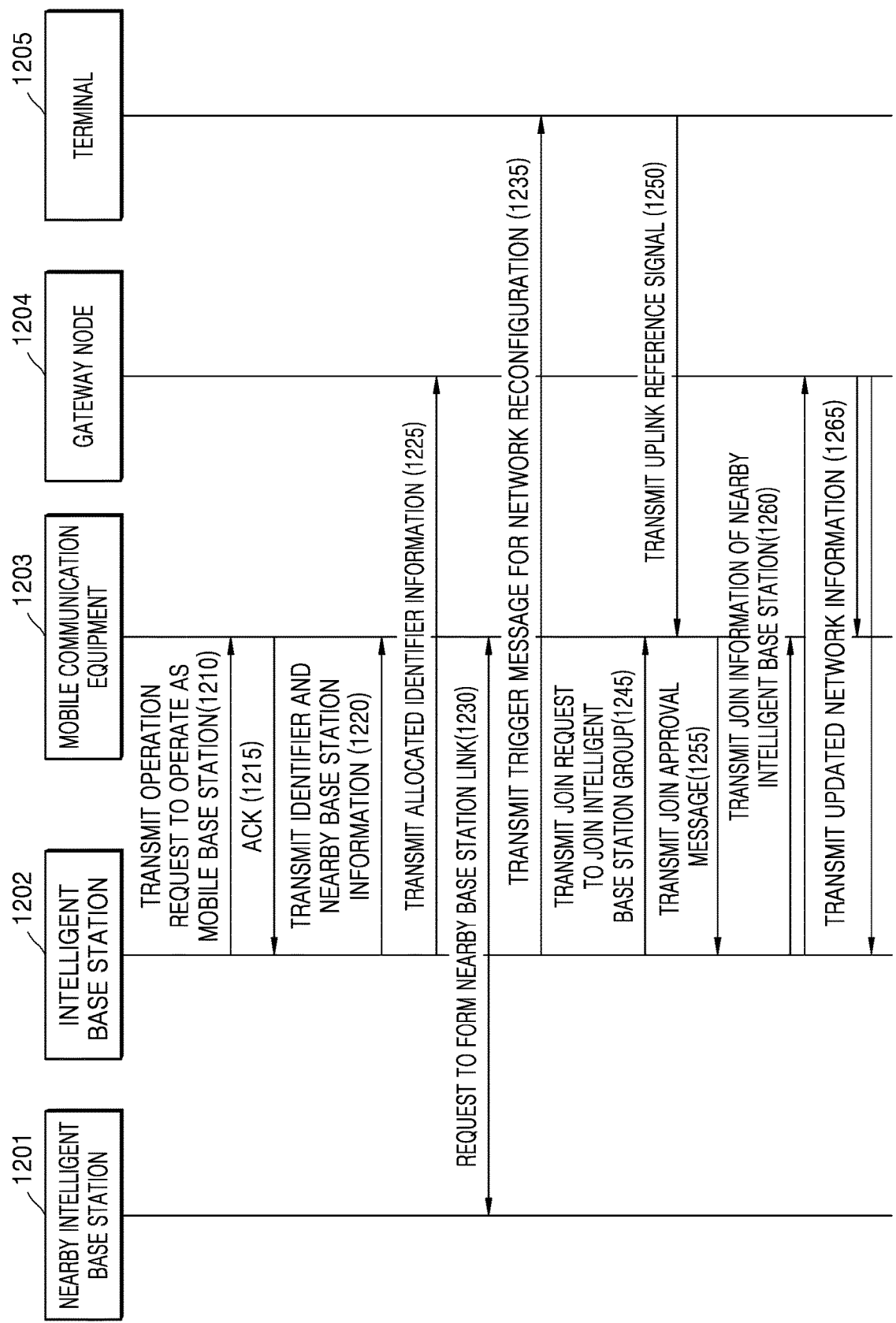
FIG. 12 is a flowchart of a method in which mobile communication equipment joins an intelligent base station group after joining a network by operating as a mobile base station, according to an embodiment of the disclosure.

FIG. 12 is a flowchart of a method in which mobile communication equipment joins an intelligent base station group after joining a network by operating as a mobile base station, according to an embodiment of the disclosure.

Referring to FIG. 12, according to an embodiment of the disclosure, mobile communication equipment 1203 may be mobile communication equipment capable of operating as a terminal receiving a network service and, as necessary, operating as an intelligent base station. When an additional intelligent base station is necessary in a network while the mobile communication equipment 1203 is receiving a network service as a terminal, the mobile communication equipment 1203 may receive the operation request to operate as a mobile base station from an intelligent base station 1202. According to another embodiment of the disclosure, the mobile communication equipment 1203 may operate only as a mobile base station without a function of a terminal. For example, the mobile communication equipment 1203 may be a mobile vehicle that is able to operate as a mobile base station at a necessary location and a necessary time to improve the QoS of the network and is operated by a communication service provider. The mobile communication equipment 1203 serving as a mobile base station without a function as a terminal may support a network service at a specific location or support a network service while following a terminal 1205, in order to only improve the performance of a network. According to an embodiment of the disclosure, because the mobile communication equipment 1203 serving as a mobile base station without a function as a terminal is freely movable according to the state of the network, the mobile communication equipment 1203 may move to a region that further needs an intelligent base station and provide a network service, based on data traffic of a specific region and mobility of the terminal. For example, the mobile communication equipment 1203 serving as a mobile base station without a function as a terminal may join as a mobile base station in the network and then may receive movement information of the terminal from a nearby intelligent base station through a control signaling link formed with the nearby intelligent base station. Based on the movement information of the terminal, the mobile communication equipment 1203 may serve as a mobile base station while moving to a location to which a plurality of terminals move.

In operation 1210, the intelligent base station 1202 may transmit an operation request to operate as a mobile base station to the mobile communication equipment 1203. According to an embodiment of the disclosure, the mobile communication equipment 1203 may be mobile communication equipment capable of operating as a terminal receiving a network service and as necessary operating as an intelligent base station. When an additional intelligent base station is necessary in a network while the mobile communication equipment 1203 is receiving a network service as a terminal, the mobile communication equipment 1203 may receive the operation request to operate as a mobile base station from an intelligent base station 1202. According to another embodiment of the disclosure, the mobile communication equipment 1203 may be mobile communication equipment 1203 serving as only a mobile base station without a function as a terminal. Accordingly, the mobile communication equipment 1203 may receive an operation request to operate as a mobile base station from the intelligent base station 1202 when an additional intelligent base station is necessary in the network.

In operation 1215, when the mobile communication equipment 1203 determines that the mobile communication equipment 1203 is able to operate as a mobile base station, the mobile communication equipment 1203 may transmit ACK to the intelligent base station 1202. According to an embodiment of the disclosure, in cases such as when the mobile communication equipment 1203 determines, as a terminal, that the QoS thereof is sufficiently satisfied, and when the mobile communication equipment 1203 determines that an additional intelligent base station is necessary due to an increase in data traffic in a current network, the mobile communication equipment 1203 may transmit ACK to the intelligent base station 1202. For example, the mobile communication equipment 1203 determines that the QoS thereof may be secured as a terminal and operating as a mobile base station is helpful to the network, the mobile communication equipment 1203 may join as a mobile base station in the network. According to another embodiment of the disclosure, the mobile communication equipment 1203 may receive the operation request to operate as a mobile base station from the intelligent base station 1202, and may determine that the mobile communication equipment 1203 is able to operate as a mobile base station at a location determined as a location where that the mobile communication equipment 1203 is able to most efficiently provide a network service to the terminal 1205. The mobile communication equipment 1203 may transmit ACK to the intelligent base station 1202 at the determined location.

In operation 1220, the intelligent base station 1202 may transmit an identifier and nearby base station information to the mobile communication equipment 1203. The nearby base station information may include, but is not limited to, a location of a nearby intelligent base station around the mobile communication equipment 1203 and an identifier of the nearby intelligent base station around the mobile communication equipment 1203. The identifier may be an identifier that may be allocated to the mobile communication equipment 1203 in order for the mobile communication equipment 1203 to operate as a mobile base station. For example, the identifier may be the ID of an intelligent base station that is to be allocated to the mobile communication equipment 1203 operating as a mobile base station.

According to an embodiment of the disclosure, the intelligent base station 1202 may determine joining of the mobile communication equipment 1203 in the network, and may request a gateway node 1204 for an identifier for the mobile communication equipment 1203. The gateway node 1204 may transmit the identifier for the mobile communication equipment 1203 to the intelligent base station 1202. The gateway node 1204 may allocate an identifier currently not allocated to another intelligent base station from a group of identifiers of intelligent base stations that may be flexibly allocated to the mobile communication equipment 1203. The gateway node 1204 may transmit the allocated identifier to the intelligent base station 1202 so that the intelligent base station 1202 may provide an identifier to the mobile communication equipment 1203. In this case, operations 1225 of transmitting allocated identifier information may be omitted.

According to another embodiment of the disclosure, the intelligent base station 1202 may previously receive, from the gateway node 1204, an identifier group that may be allocated to the mobile communication equipment 1203. The intelligent base station 1202 may allocate one identifier from the received identifier group to the mobile communication equipment 1203, and may transmit nearby base station information to the mobile communication equipment 1203. Accordingly, in operation 1225, the intelligent base station 1202 may transmit allocated identifier information to the gateway node 1204 to inform the gateway node 1204 of what identifier has been allocated.

In operation 1230, the mobile communication equipment 1203 may form a nearby base station link with a nearby intelligent base station 1201, as a mobile base station. According to an embodiment of the disclosure, operation 1230 may correspond to operation 960 described above with reference to FIG. 9.

Operations 1235, 1245, 1250, 1255, 1260, and 1265 of FIG. 12 are the same as operations 520, 530, 540, 550, 560, and 570 of FIG. 5, and thus brief descriptions thereof will now be given. According to an embodiment of the disclosure, the mobile communication equipment 1203 may join the network and operate as a mobile base station. The intelligent base station 1202 may perform an intelligent base station group reconfiguration process of requesting the mobile communication equipment 1203 serving as a mobile base station to join an intelligent base station group. In operation 1235, when the intelligent base station 1202 determines that reconfiguration of the intelligent base station group is necessary, the intelligent base station 1202 may transmit a trigger message for network reconfiguration to the terminal 1205. In operation 1245, the intelligent base station 1202 may transmit a join request to join the intelligent base station group to the mobile communication equipment 1203 that has joined the network and operated as a mobile base station. In operation 1250, the terminal 1205 may transmit an uplink reference signal to the mobile communication equipment 1203. In operation 1255, when the mobile communication equipment 1203 determines that joining the intelligent base station group is beneficial to the QoS of the mobile communication equipment 1203 or the terminal 1205, the mobile communication equipment 1203 may transmit a join approval message to the intelligent base station 1202. In operation 1260, the intelligent base station 1202 may determine joining of the mobile communication equipment 1203 in the intelligent base station group by determining that the joining of the mobile communication equipment 1203 is beneficial to the network, and may transmit join information of a nearby intelligent base station to the mobile communication equipment 1203 and the gateway node 1204. In other words, the join information of a nearby intelligent base station may include join information of the mobile communication equipment 1203. In operation 1265, the gateway node 1204 may transmit updated network information to the intelligent base station 1202 and the mobile communication equipment 1203.

Figure 13:
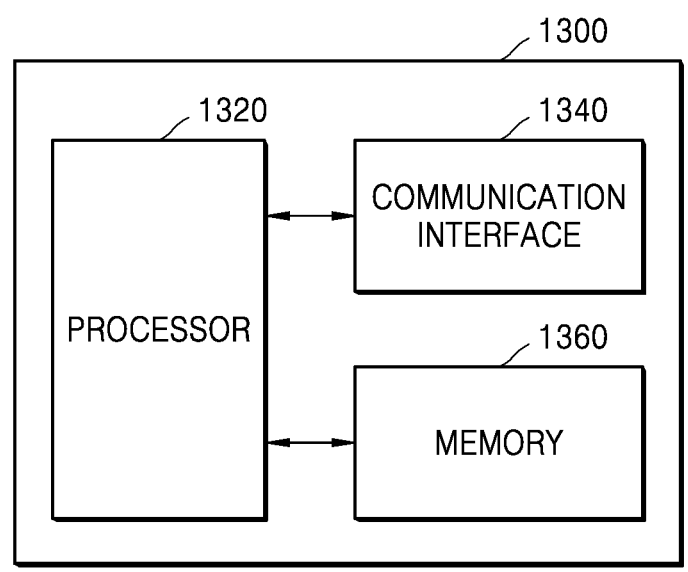
FIG. 13 is a block diagram of a structure of an intelligent base station in a wireless communication system, according to an embodiment of the disclosure.

FIG. 13 is a block diagram of a structure of an intelligent base station in a wireless communication system, according to an embodiment of the disclosure.

Referring to FIG. 13, an intelligent base station 1300 may include a processor 1320, a communication interface 1340, and a memory 1360. All of the components illustrated in FIG. 13 are not essential components of the intelligent base station 1300. More or less components than those illustrated in FIG. 13 may constitute the intelligent base station 1300. Furthermore, the communication interface 1340, the memory 1360, and the processor 1320 may be implemented as a single chip.

The processor 1320 may control an overall operation of the intelligent base station 1300, and may include at least one processor, such as a central processing unit (CPU) or a graphics processing unit (GPU). The processor 1320 may control the other components included in the intelligent base station 1300 to perform an operation for operating the intelligent base station 1300. For example, the processor 1320 may execute a program stored in the memory 1360, read a file stored in the memory 1360, or store a new file in the memory 1360. According to an embodiment of the disclosure, the processor 1320 may perform an operation for operating the intelligent base station 1300, by executing the programs stored in the memory 1360. For example, the processor 1320 may determine whether reconfiguration of an intelligent base station group is necessary, based on movement information of a terminal, may transmit a join request to join the intelligent base station group to a nearby intelligent base station not included in the intelligent base station group, when it is determined that reconfiguration of an intelligent base station group is necessary, may receive a join approval message in response to the join request, and may reconfigure the intelligent base station group, based on the join approval message.

According to an embodiment of the disclosure, the communication interface 1340 may transceive a signal with a terminal connected to the intelligent base station 1300 by wire or wirelessly or another intelligent base station. The signal may include control information and data. For example, the communication interface 1340 may transceive network information through a link formed with another intelligent base station within an intelligent base station group that supports a terminal. The communication interface 1340 may receive a signal and output the signal to the processor 1320 through a wireless channel, and may transmit the signal output by the processor 1320 through a wireless channel.

According to an embodiment of the disclosure, the memory 1360 may store various types of data such as a program, such as an application necessary for an operation of the intelligent base station 1300, and a file. Furthermore, the memory 1360 may store control information or data included in the signal obtained by the terminal connected to the intelligent base station 1300 by wire or wirelessly or the other intelligent base station. The memory 1360 may include storage media, such as read-only memory (ROM), random access memory (RAM), a hard disk, compact disc (CD)-ROM, and a digital versatile disc (DVD), or a combination thereof. Furthermore, the memory 1360 may be composed of a plurality of memories. The processor 1320 may access and use data stored in the memory 1360 or may store new data in the memory 1360. According to an embodiment of the disclosure, the memory 1360 may store location information and an identifier of the other intelligent base station that constitutes the intelligent base station group, and location information and an identifier of a nearby intelligent base station. The memory 1360 may also store information pre-trained to optimize the network.

Figure 14:
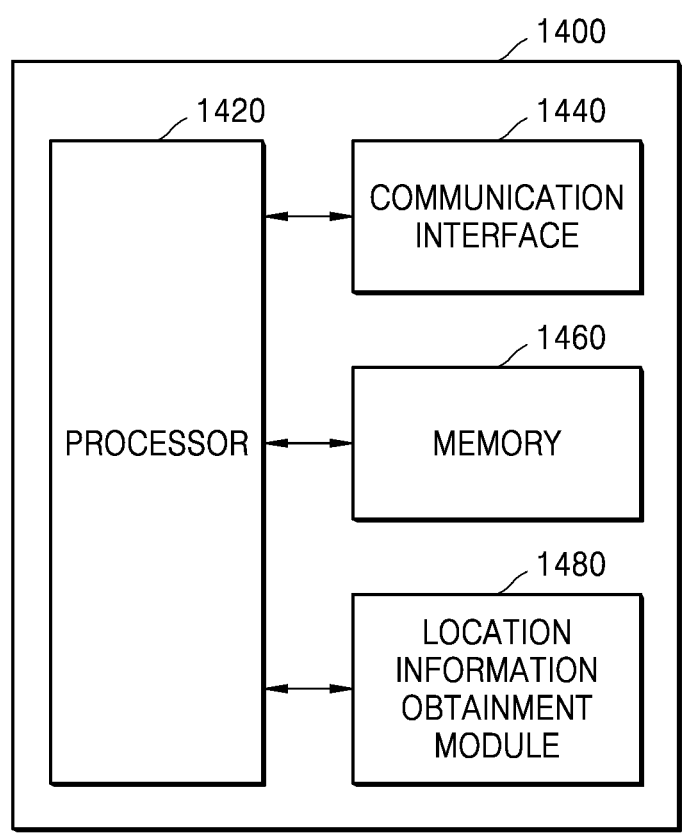
FIG. 14 is a block diagram of a structure of mobile communication equipment in a wireless communication system, according to an embodiment of the disclosure.

FIG. 14 is a block diagram of a structure of a mobile base station in a wireless communication system, according to an embodiment of the disclosure.

Referring to FIG. 14, mobile communication equipment 1400 may include a processor 1420, a communication interface 1440, a memory 1460, and a location information obtainment module 1480. All of the components illustrated in FIG. 14 are not essential components of the mobile communication equipment 1400. More or less components than those illustrated in FIG. 14 may constitute the mobile communication equipment 1400. Furthermore, the processor 1420, the communication interface 1440, the memory 1460, and the location information obtainment module 1480 may be implemented as a single chip.

The processor 1420 may control an overall operation of the mobile communication equipment 1400, and may include at least one processor, such as a CPU or a GPU. The processor 1420 may control the other components included in the mobile communication equipment 1400 to perform an operation for operating the mobile communication equipment 1400. For example, the processor 1420 may execute a program stored in the memory 1460, read a file stored in the memory 1460, or store a new file in the memory 1460. According to an embodiment of the disclosure, the processor 1420 may perform an operation for operating the mobile communication equipment 1400, by executing the programs stored in the memory 1460. For example, the processor 1420 may receive an operation request to operate as a mobile base station from an intelligent base station, determine whether to operate as a mobile base station, based on the operation request, transmit an operation approval message to the intelligent base station, when it is determined to operate as a mobile base station, and receive an identifier for operating as a mobile base station and information of neighboring intelligent base stations from the intelligent base station within the intelligent base station group.

According to an embodiment of the disclosure, the communication interface 1440 may transceive a signal with a terminal connected to the mobile communication equipment 1400 by wire or wirelessly or another intelligent base station. The signal may include control information and data. For example, the communication interface 1440 may transceive network information through a link formed with a nearby intelligent base station while operating as a mobile base station. The communication interface 1440 may receive a signal and output the signal to the processor 1420 through a wireless channel, and may transmit the signal output by the processor 1420 through a wireless channel.

According to an embodiment of the disclosure, the memory 1460 may store various types of data such as a program, such as an application necessary for an operation of the mobile communication equipment 1400, and a file. Furthermore, the memory 1460 may store control information or data included in the signal obtained by the terminal connected to the mobile communication equipment 1400 by wire or wirelessly or the other intelligent base station. The memory 1460 may include storage media, such as read-only memory (ROM), random access memory (RAM), a hard disk, compact disc (CD)-ROM, and a digital versatile disc (DVD), or a combination thereof. Furthermore, the memory 1460 may be composed of a plurality of memories. The processor 1420 may access and use data stored in the memory 1460 or may store new data in the memory 1460. According to an embodiment of the disclosure, the memory 1460 may store location information and an identifier of the nearby intelligent base station that are necessary to optimize the network, and data pre-trained to optimize the network.

According to an embodiment of the disclosure, the location information obtainment module 1480 may be a sensor configured to estimate a current geographical position of the mobile communication equipment 1400. In other words, the location information obtainment module 1480 may include a transceiver configured to estimate a geographical position of the mobile communication equipment 1400. According to an embodiment of the disclosure, a communication service provider may receive the geographical position of the mobile communication equipment 1400 from the location information obtainment module 1480 and may adjust the position of the mobile communication equipment 1400 in order to improve the performance of the network. For example, the location information obtainment module 1480 may be, but is not limited to, a GPS module, a short-range communication module, a Bluetooth module, a Beidou module, a quasi-zenith satellite system (QZSS) module, a Galileo module, or a global satellite navigation system module.

Although not shown in FIG. 14, the mobile communication equipment 1400 may further include a running gear system (not shown). According to an embodiment of the disclosure, the running gear system may receive a destination from a communication service provider to improve network performance, and may move the position of the mobile communication equipment 1400 to the received destination.

The methods according to embodiments of the disclosure as described in the specification or in the following claims may be implemented as hardware, software, or a combination of hardware and software.

When implemented as software, a computer-readable storage medium or computer program product storing one or more programs (e.g., software modules) may be provided. The one or more programs stored in the computer-readable storage medium or computer program product are configured for execution by one or more processors in an electronic device. The one or more programs include instructions directing the electronic device to execute the methods according to embodiments of the disclosure as described the specification or in the following claims.

The programs (e.g., software modules or software) may be stored in non-volatile memory (including RAM or flash memory), ROM, electrically erasable programmable read only memory (EEPROM), a magnetic disc storage device, a CD-ROM, a DVD, another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), and a storage area network (SAN). Such a storage device may access the electronic device performing the embodiments of the disclosure via an external port. Furthermore, a separate storage device on the communication network may access a device performing the embodiments of the disclosure.

In the above-described embodiments of the disclosure, the elements included in the disclosure are expressed in a singular or plural form according to the proposed specific embodiment of the disclosure. However, the singular or plural expression is appropriately selected for ease of description according to the presented situation, and the disclosure is not limited to a single element or plural elements. Those elements described in a plural form may be configured as a single element, and those elements described in a singular form may be configured as plural elements.

According to the present embodiment of the disclosure, an intelligent base station in a communication system may efficiently support a terminal by forming an intelligent base station group around the terminal.

The embodiments of the disclosure disclosed in the specification and drawings are merely presented specific examples to easily explain the technical contents of the disclosure and promote understanding of the disclosure, and are not intended to limit the scope of the disclosure. In other words, it is obvious to those skilled in the art that other modifications based on the technical spirit of the disclosure can be implemented. In addition, the above embodiments of the disclosure can be combined with each other and operate when necessary. For example, portions of one embodiment of the disclosure and another embodiment of the disclosure may be combined with each other.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An operation method of a first base station in a wireless communication system, the operation method comprising:
    determining whether reconfiguration of a base station group that supports a terminal is necessary, according to movement information of the terminal, the determination being performed by the first base station included in the base station group;
    in case that the first base station determines that the reconfiguration of the base station group is necessary, transmitting, to a nearby base station, a join request to join the base station group, wherein the nearby base station is not included in the base station group;
    receiving, from the nearby base station, a join approval message in response to the transmitted join request; and
    reconfiguring the base station group, based on the received join approval message,
    wherein the join approval message includes at least one of an amount of traffic of the nearby base station, a power of an uplink reference signal transmitted by the terminal, or a signal to noise ratio (SNR).

2. The operation method of claim 1,
    wherein the determining of whether the reconfiguration of the base station group is necessary comprises:
        receiving, from a second base station within the base station group, network information necessary to determine whether reconfiguration of the base station group is necessary; and
        determining whether reconfiguration of the intelligent base station group is necessary, based on the received network information, and
    wherein the network information includes at least one of a power of an uplink reference signal received by the second base station from the terminal, a signal to noise ratio (SNR), an amount of traffic of the terminal, or a quality of service (QoS) of the terminal.

3. The operation method of claim 1, wherein the reconfiguring of the base station group comprises:
    determining, based on the received join approval message, whether to include the nearby base station in the base station group;
    transmitting join information of the nearby base station to the nearby base station and a gateway node; and
    receiving updated base station group information from the gateway node.

4. The operation method of claim 1, further comprising:
    forming a control signaling link with another base station included in the base station group; and
    exchanging network information between the other base station and the terminal through the formed control signaling link,
    wherein the network information includes at least one of a number of terminals connected to each of the base stations in the base station group, an amount of traffic of a terminal supported by each of the base stations in the base station group, a power of a received uplink reference signal, a quality of service (QoS) of the terminal supported by each of the base stations within the base station group, a signal to noise ratio(SNR), or mobility information of the terminal predicted by each of the base stations in the base station group.

5. The operation method of claim 1, further comprising:
    selecting the first base station, based on at least one of scheduling information, a channel state information, or predicted mobility information of the terminal; and
    transmitting, to another base station of the base station group, information about the selected first base station.

6. The operation method of claim 1, further comprising:
    determining whether to operate mobile communication equipment not included in the base station group as a mobile base station; and
    allocating, to the mobile communication equipment, an identifier necessary for the mobile communication equipment to operate as the mobile base station,
    wherein the nearby base station is the mobile base station.

7. The operation method of claim 6, wherein the determining whether to operate the mobile communication equipment as the mobile base station comprises:
    transmitting, to the mobile communication equipment, an operation request to operate as the mobile base station;
    receiving, from the mobile communication equipment, an operation approval message; and
    determining whether to operate the mobile communication equipment as the mobile base station.

8. The operation method of claim 6, wherein the determining whether to operate the mobile communication equipment as the mobile base station comprises:
    receiving, from the mobile communication equipment, a network join request message; and
    transmitting, to the mobile communication equipment, a network join approval message based on the received network join request message.

9. The operation method of claim 6, wherein the allocating of the identifier to the mobile communication equipment comprises:
    allocating the identifier received in response to a request according to the result of the determining whether to operate the mobile communication equipment as the mobile base station or previously received in response to a request to the mobile communication equipment, in case that it is determined whether to operate the mobile communication equipment as the mobile base station.

10. An operation method of a nearby intelligent base station in a wireless communication system, the operation method comprising:
    receiving, from a base station within a base station group, a join request to join the base station group that supports a terminal;
    receiving, from the terminal, an uplink reference signal based on the join request;
    determining whether to join the base station group, based on the received uplink reference signal;
    in case that the nearby base station determines to join the base station group, transmitting, to the base station, a join approval message; and
    supporting the terminal by serving as a base station within the base station group, based on the transmitted join approval message.

11. The operation method of claim 10, further comprising:
    receiving, from the base station, join information of the nearby base station based on the join approval message; and
    receiving, from a gateway node, updated base station group information.

12. The operation method of claim 10, wherein the determining whether to join the base station group comprises determining whether to join the base station group, based on at least one of a quality of service (QoS) of the terminal or an amount of traffic of the nearby base station.

13. The operation method of claim 10, further comprising:
receiving an operation request to operate as a mobile base station, from the base station;
determining whether to operate as the mobile base station, based on the operation request;
in case that the nearby base station determines to operate as the mobile base station, transmitting an operation approval message to the base station; and
receiving, from the base station within the base station group, an identifier for operating as the mobile base station and information about a neighboring base station,
wherein the nearby base station is another mobile base station not included in the base station group.

14. The operation method of claim 10, further comprising:
determining whether to operate as a mobile base station, based on at least one of a quality of service (QoS) of mobile communication equipment or traffic of a network;
in case that the nearby base station determines whether to operate as the mobile base station, transmitting a network join request message to the base station; and
receiving an identifier for operating as the mobile base station and information about a neighboring base station, from the base station within the base station group,
wherein the nearby base station is another mobile base station not included in the base station group.

15. A first base station within a base station group that supports a terminal in a wireless communication system, the first base station comprising:
a communication interface;
a memory configured to store one or more instructions; and
one or more processors configured to execute the one or more instructions stored in the memory to:
determine whether reconfiguration of the base station group is necessary, according to movement information of the terminal,
in case that the first base station determines that reconfiguration of the base station group is necessary, transmit, to a nearby base station, a join request to join the base station group, wherein the nearby base station is not included in the base station group,
receive, from the nearby base station, a join approval message in response to the transmitted join request, and
reconfigure the base station group, based on the received join approval message,
wherein the join approval message includes at least one of an amount of traffic of the nearby base station, a power of an uplink reference signal transmitted by the terminal, or a signal to noise ratio (SNR).

16. The first base station of claim 15,
wherein the one or more processors are further configured to executed the one or more instructions to:
receive, from a second base station within the base station group, network information necessary to determine whether reconfiguration of the base station group is necessary, and
determine whether reconfiguration of the base station group is necessary, based on the received network information, and
wherein the network information includes power of an uplink reference signal received by the second base station from the terminal, a signal to noise ratio (SNR), an amount of traffic of the terminal, or a quality of service (QoS) of the terminal.

17. The first base station of claim 15,
wherein the one or more processors are further configured to execute the one or more instructions to:
determine whether to operate mobile communication equipment not included in the base station group as a mobile base station, and
allocate an identifier necessary for the mobile communication equipment to operate as the mobile base station to the mobile communication equipment, and
wherein the nearby intelligent base station is the mobile base station.

18. A nearby base station in a wireless communication system, the nearby base station comprising:
a transceiver;
a memory storing one or more instructions; and
one or more processors configured to execute the one or more instructions stored in the memory to:
receive, from a base station within a base station group, a join request to join the base station group that supports a terminal,
receive, from the terminal, an uplink reference signal based on the join request,
determine whether to join the base station group, based on the received uplink reference signal,
in case that the nearby base station determines to join the base station group, transmit, to the base station, a join approval message, and
support the terminal by serving as a base station within the base station group, based on the transmitted join approval message.

19. The nearby base station of claim 18,
wherein the one or more processors are further configured to execute the one or more instructions to:
receive an operation request to operate as a mobile base station, from the base station,
determine whether to operate as the mobile base station, based on the operation request,
in case that the nearby base station determines whether to operate as the mobile base station, transmit an operation approval message to the base station, and
receive, from the base station within the base station group, an identifier for operating as the mobile base station and information about a neighboring base station, and
wherein the nearby base station is another mobile base station not included in the base station group.

* * * * *